United States Patent
Chen et al.

(10) Patent No.: US 12,262,437 B2
(45) Date of Patent: Mar. 25, 2025

(54) RRC CONNECTION RESUME METHOD AND DEVICE

(71) Applicant: HUAWEI TECHNOLOGIES CO., LTD., Shenzhen (CN)

(72) Inventors: Lei Chen, Beijing (CN); Bingzhao Li, Beijing (CN); Zonghui Xie, Shenzhen (CN); Haifeng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/738,479

(22) Filed: May 6, 2022

(65) Prior Publication Data

US 2022/0264392 A1 Aug. 18, 2022

Related U.S. Application Data

(63) Continuation of application No. PCT/CN2019/116341, filed on Nov. 7, 2019.

(51) Int. Cl.
*H04W 76/19* (2018.01)
*H04L 5/00* (2006.01)
*H04W 76/27* (2018.01)

(52) U.S. Cl.
CPC .......... *H04W 76/19* (2018.02); *H04L 5/0051* (2013.01); *H04W 76/27* (2018.02)

(58) Field of Classification Search
None
See application file for complete search history.

(56) References Cited

U.S. PATENT DOCUMENTS

2020/0029262 A1* 1/2020 Kim .................. H04W 36/0094
2020/0351723 A1* 11/2020 Kim ..................... H04W 36/08
(Continued)

FOREIGN PATENT DOCUMENTS

CN  109699050 A  4/2019
CN  110192408 A  8/2019
(Continued)

OTHER PUBLICATIONS

"3rd Generation Partnership Project; Technical Specification Group Radio.Access Network; NR; Radio Resource Control (RRC) protocol specification (Release 15)", 3GPP Draft; 38331-F70,Sep. 27, 2019 (Sep. 27, 2019), XP051799980, total 528 pages.
(Continued)

*Primary Examiner* — Saumit Shah
(74) *Attorney, Agent, or Firm* — HAUPTMAN HAM, LLP

(57) ABSTRACT

A radio resource control (RRC) connection resume method includes receiving, by a first network device, an RRC connection resume request message from a terminal device. The RRC connection resume request message is used to request to resume an RRC connection of the terminal device. The method also includes sending a first message to a second network device. The first message includes auxiliary information. The auxiliary information includes at least one of information used by the terminal device to perform redirection or information used by the terminal device to perform cell reselection, or the auxiliary information indicates that the first network device cannot respond to the RRC connection resume request message of the terminal device. The method further includes receiving an RRC release message from the second network device. The method additionally includes sending the RRC release message to the terminal device.

20 Claims, 6 Drawing Sheets

(56) References Cited

U.S. PATENT DOCUMENTS

| | | | | |
|---|---|---|---|---|
| 2021/0377829 A1* | 12/2021 | Wang | ............... | H04W 36/0088 |
| 2022/0151011 A1* | 5/2022 | Chang | ................ | H04W 76/27 |
| 2022/0394572 A1* | 12/2022 | Wu | ............... | H04W 36/00222 |
| 2023/0007623 A1* | 1/2023 | Da Silva | ............. | H04W 24/08 |

FOREIGN PATENT DOCUMENTS

| | | |
|---|---|---|
| CN | 110381554 A | 10/2019 |
| EP | 3826422 A1 | 5/2021 |
| WO | 2018226024 A1 | 12/2018 |
| WO | 2019093850 A1 | 5/2019 |

OTHER PUBLICATIONS

"3rd Generation Partnership Project; Technical Specification Group Radio Access Network; NR; NR and NG-RAN Overall Description; Stage 2 (Release 15)", 3GPP Standard; Technical Specification;3GPP TS 38.300, V15.7.0 , Sep. 26, 2019, pp. 1-99, XP051784917.

"3rd Generation Partnership Project; Technical Specification Group Radio Access Network; NR; User Equipment(UE) procedures in Idle mode and RRC Inactive state (Release 15)", 3GPF Draft; 38.304 V15.5.0,FSO,Sep. 28, 2019, total 30 pages.

Huawei: "(TP for NR BL CR for 38.413) RNA update for overload control.",3GPP Draft; R3-186433,Nov. 11, 2018, XP051558225, total 4 pages.

Extended European Search Report issued in corresponding European Application No. 19952119.6, dated Oct. 5, 2022, pp. 1-12.

Huawei et al., "Comments on RRC Inactive Security Issue", 3GPP TSG SA WG3 (Security) Meeting #92 ad-hoc S3-183045, Sep. 28, 2018, total 3 pages.

Qualcomm Incorporated, "Connection Resume and RNAU", 3GPP TSG-RAN WG2 Meeting #102 R2-1808247, May 25, 2018, total 4 pages.

Huawei et al., "Discussion on Inactive State in NTN", 3GPP TSG-RAN WG2 Meeting #107bis R2-1913176, Oct. 18, 2019, total 11 pages.

3GPP TS 24.501 V16.2.0 (Sep. 2019), 3rd Generation Partnership Project; Technical Specification Group Core Network and Terminals; Non-Access-Stratum (NAS) protocol for 5G System (5GS); Stage 3 (Release 15), 610 pages.

International Search Report issued in corresponding International Application No. PCT/CN2019/116341, dated Jul. 27, 2020, pp. 1-11.

\* cited by examiner

RRC CONNECTION RESUME METHOD AND DEVICE

CROSS-REFERENCE TO RELATED APPLICATIONS

This application is a continuation of International Application No. PCT/CN2019/116341, filed on Nov. 7, 2019, the disclosure of which is hereby incorporated by reference in its entirety.

TECHNICAL FIELD

This application relates to the field of mobile communication technologies, and in particular, to an RRC connection resume method and a device.

BACKGROUND

In discussion of a 5th generation (5G) mobile communication technology standard, a radio resource control (RRC) inactive state is introduced for a terminal device. The inactive state is more energy-saving compared with an RRC connected state, and a latency of accessing a network in the inactive state is shorter compared with that in an RRC idle state.

If a terminal device in the RRC inactive state needs to re-enter the RRC connected state, the terminal device may send an RRC resume request message to a base station on which the terminal device currently camps, to resume an RRC connection to the base station. However, in some cases, the base station may be unable to support the terminal device in entering the RRC connected state. For example, the base station has heavy load, or the base station does not support a service requested by the terminal device. If the base station cannot support the terminal device in entering the RRC connected state, the base station releases the terminal device. To release the terminal device, the base station needs to send an RRC release message to the terminal device, where the RRC release message needs to be encryption and integrity protected. A key used to perform encryption and integrity protection on the RRC release message is stored in an anchor base station of the terminal device. The anchor base station is a base station that releases the terminal device to the RRC inactive state. If the base station on which the terminal device currently camps and the anchor base station are not a same base station, the current base station needs to interact with the anchor base station to complete processes such as context transfer of the terminal device, and obtain a corresponding key. Then, the current base station can send the RRC release message to the terminal device.

It can be learned that signaling overheads and a latency in a current process for releasing the terminal device are large.

SUMMARY

Embodiments of this application provide an RRC connection resume method and a device, to reduce signaling overheads and a latency in an RRC connection resume process of a terminal device.

According to a first aspect, a first RRC connection resume method is provided. The method includes: A first network device receives an RRC connection resume request message from a terminal device, where the RRC connection resume request message is used to request to resume an RRC connection of the terminal device, and the terminal device is in an RRC inactive state. The first network device sends a first message to a second network device, where the first message includes auxiliary information, the auxiliary information includes information used by the terminal device to perform redirection and/or information used by the terminal device to perform cell reselection, the first network device is a network device on which the terminal device camps, and the second network device is an anchor network device of the terminal device. The first network device receives an RRC release message from the second network device, where the RRC release message includes the information used by the terminal device to perform redirection and/or the information used by the terminal device to perform cell reselection. The first network device sends the RRC release message to the terminal device.

The method may be performed by a first communication apparatus. The first communication apparatus may be a communication device or a communication apparatus, for example, a chip, that can support a communication device in implementing a function in the method. For example, the first communication apparatus is the first network device, or a chip that is deployed in the first network device and configured to implement a function of a network device, or another component configured to implement a function of the first network device. In the following description process, an example in which the first communication apparatus is the first network device is used.

In this embodiment of this application, the first network device is a network device on which the terminal device currently camps, and the second network device is an anchor network device of the terminal device. After the network device on which the terminal device currently camps receives the RRC connection resume request message from the terminal device, if the network device expects to release the terminal device, the network device may request the anchor network device of the terminal device to generate the RRC release message, and the network device only needs to send the RRC release message to the terminal device. It can be learned that, according to the technical solution provided in this embodiment of this application, the RRC release message may be generated by the anchor network device of the terminal device, and does not need to be generated by the network device on which the terminal device currently camps. Therefore, the network device on which the terminal device currently camps may not need to transfer a context of the terminal device or the like to the network device, so that steps that need to be performed, a latency, and signaling overheads caused in interaction processes such as context transfer are reduced. In addition, the first message may further include the auxiliary information, and the anchor network device may generate the release message based on the auxiliary information, so that information that needs to be determined by the anchor network device is reduced.

In a possible implementation, the information used by the terminal device to perform redirection includes one or more of the following:

information about a redirection frequency;
a subcarrier spacing corresponding to a redirection frequency reference signal; or
time domain location information of a redirection frequency reference signal.

For example, the information used by the terminal device to perform redirection may include the information about the redirection frequency; or the subcarrier spacing corresponding to the redirection frequency reference signal and the time domain location information of the redirection frequency reference signal; or the information about the redirection frequency, the subcarrier spacing corresponding to the redirection frequency reference signal, and the time domain location information of the redirection frequency reference signal. The redirection frequency may include one or more frequencies. The time domain location information of the redirection frequency reference signal may be time domain location information of a synchronization signal and physical broadcast channel block (synchronization signal and PBCH block, SSB) signal on the redirection frequency. After obtaining the information, the terminal device may perform redirection based on the information, so that an RRC connection can be resumed as soon as possible in a redirection cell.

In a possible implementation, the information used by the terminal device to perform cell reselection includes:
    priority information of a frequency used when the terminal device performs cell reselection.

The information used by the terminal device to perform cell reselection may include the priority information of the frequency used when the terminal device performs cell reselection. For example, the information used by the terminal device to perform cell reselection may include priority information of a frequency 1 and priority information of a frequency 2. For example, a priority of the frequency 1 is higher than a priority of the frequency 2. In this case, when performing cell reselection, for example, the terminal device may first measure a higher-priority frequency and then measure a lower-priority frequency, that is, first measure the frequency 1 and then measure the frequency 2. Alternatively, the terminal device performs measurement without distinguishing. However, if there are cells that meet a reselection condition at both the higher-priority frequency and the lower-priority frequency, the terminal device may reselect a cell on the higher-priority frequency. For example, if the terminal device determines through measurement that a cell 1 at the frequency 1 meets the reselection condition, and that a cell 2 at the frequency 2 also meets the reselection condition, the terminal device may reselect the cell 1. Based on the priority information, the terminal device can perform cell reselection more pertinently, to select a suitable cell more quickly. Certainly, the information used by the terminal device to perform cell reselection may further include another information. This is not specifically limited thereto.

According to a second aspect, a second RRC connection resume method is provided. The method includes: A second network device receives a first message from a first network device, where the first message includes auxiliary information, the auxiliary information includes information used by a terminal device to perform redirection and/or information used by the terminal device to perform cell reselection, the first network device is a network device on which the terminal device camps, and the second network device is an anchor network device of the terminal device. The second network device generates an RRC release message, where the RRC release message includes the information used by the terminal device to perform redirection and/or the information used by the terminal device to perform cell reselection. The second network device sends the RRC release message to the first network device.

The method may be performed by a second communication apparatus. The second communication apparatus may be a communication device or a communication apparatus, for example, a chip, that can support a communication device in implementing a function in the method. For example, the second communication apparatus is the second network device, or a chip that is deployed in the second network device and configured to implement a function of a network device, or another component configured to implement a function of the first network device. In the following description process, an example in which the second communication apparatus is the second network device is used.

In a possible implementation, the information used by the terminal device to perform redirection includes one or more of the following:
    information about a redirection frequency;
    a subcarrier spacing corresponding to a redirection frequency reference signal; or
    time domain location information of a redirection frequency reference signal.

In a possible implementation, the information used by the terminal device to perform cell reselection includes:
    priority information of a frequency used when the terminal device performs cell reselection.

For technical effects brought by the second aspect or the possible implementations, refer to descriptions of the technical effects brought by the first aspect or the corresponding implementations.

According to a third aspect, a third RRC connection resume method is provided. The method includes: A first network device receives an RRC connection resume request message from a terminal device, where the RRC resume request message is used to request to resume an RRC connection of the terminal device, and the terminal device is in an RRC inactive state. The first network device sends a first message to a second network device, where the first message includes auxiliary information, the auxiliary information is used to indicate that the first network device cannot respond to the RRC connection resume request message of the terminal device, the first network device is a network device on which the terminal device camps, and the second network device is an anchor network device of the terminal device. The first network device receives an RRC release message from the second network device, where the RRC release message includes information used by the terminal device to perform redirection and/or information used by the terminal device to perform cell reselection. The first network device sends the RRC release message to the terminal device.

In this embodiment of this application, the first network device is a network device on which the terminal device currently camps, and the second network device is an anchor network device of the terminal device. After the network device on which the terminal device currently camps receives the RRC connection resume request message from the terminal device, if the network device expects to release the terminal device, the network device may request the anchor network device of the terminal device to generate the RRC release message, and the network device only needs to send the RRC release message to the terminal device. It can be learned that, according to the technical solution provided in this embodiment of this application, the RRC release message may be generated by the anchor network device of the terminal device, and does not need to be generated by the network device on which the terminal device currently camps. Therefore, the network device on which the terminal device currently camps may not need to transfer a context of the terminal device or the like to the network device, so that steps that need to be performed, a latency, and signaling overheads caused in interaction processes such as context transfer are reduced. In addition, the first message may further include the auxiliary information, and the anchor network device may generate the release message based on the auxiliary information, so that information that needs to be determined by the anchor network device is reduced.

In addition, content included in the RRC release message may be determined by the second network device. Because the second network device stores the context of the terminal device, the second network device can accordingly determine the RRC release message. However, since the first network device has decided to release the terminal device, the first network device may not need to do much work, so that load of the first network device can be reduced.

In a possible implementation, that the auxiliary information is used to indicate that the first network device cannot respond to the RRC connection resume request message includes:

the auxiliary information includes first indication information, where the first indication information is used to indicate that the first network device cannot respond to the RRC connection resume request message.

If an existing message is reused as the first message, for example, the first message is a retrieve UE context request message, for example, the first indication information occupies one bit. If a value of the one bit is "1", it indicates that the first network device can respond to the RRC connection resume request message from the terminal device. If a value of the one bit is "0", it indicates that the first network device cannot respond to the RRC connection resume request message from the terminal device. Alternatively, if the first message includes the first indication information, it indicates that the first network device cannot respond to the RRC connection resume request message from the terminal device; if the first message does not include the first indication information, it indicates that the first network device can respond to the RRC connection resume request message from the terminal device.

Alternatively, if the first message is a dedicated message newly added in this embodiment of this application, if the first network device can respond to the RRC connection resume request message from the terminal device, the first network device may not need to send the first message to the second network device. The first network device sends the first message to the second network device only when the first network device cannot respond to the RRC connection resume request message from the terminal device. If the first network device sends the first message to the second network device, the first message may include the first indication information, indicating that the first network device cannot respond to the RRC connection resume request message from the terminal device, or indicating that the first network device releases the terminal device.

That the first network device cannot respond to the RRC connection resume request message can be simply indicated using the first indication information. Such an indication manner is simple and clear.

In a possible implementation, the auxiliary information includes a cause for which the first network device cannot respond to the RRC connection resume request message.

For example, the auxiliary information includes a second cause value, and the second cause value may indicate the cause for which the first network device cannot respond to the RRC connection resume request message. In this embodiment of this application, the auxiliary information may include the first indication information, but does not include the second cause value. Using the first indication information can already indicate that the first network device cannot respond to the RRC connection resume request message from the terminal device, achieving the indication purpose and reducing signaling overheads. Alternatively, the auxiliary information may include the second cause value, but does not include the first indication information. Using the second cause value can indicate that the first network device cannot respond to the RRC connection resume request message from the terminal device, and also indicate the cause for which the first network device cannot respond to the RRC connection resume request message from the terminal device. A larger amount of content can be indicated using one piece of information, with no need to send more information. This helps reduce signaling overheads. Alternatively, the auxiliary information includes both the first indication information and the second cause value. The first indication information indicates that the first network device cannot respond to the RRC connection resume request message from the terminal device, and the second cause value indicates the cause for which the first network device cannot respond to the RRC connection resume request message from the terminal device. Different content is indicated using different information, making the indication clearer.

In a possible implementation, the cause for which the first network device cannot respond to the RRC connection resume request message includes:

the first network device does not support a service indicated by the RRC connection resume request message; and/or a load quantity of the first network device is greater than a threshold.

The cause for which the first network device cannot respond to the RRC connection resume request is, for example, that the first network device does not support the service indicated by the RRC connection resume request message, or that the first network device has heavy load (for example, the load quantity of the first network device is greater than a threshold), or that the first network device does not support the service indicated by the RRC connection resume request message, and the first network device has heavy load. The threshold may be configured by the first network device or a core network device, or may be protocol-specified.

In a possible implementation, the auxiliary information further includes a frequency of a first cell and/or an identifier of the first cell.

The first cell is a cell in which the first network device receives the RRC connection resume request message.

The auxiliary information may further include information about the first cell. For example, the information about the first cell includes the frequency of the first cell, or includes the identifier of the first cell, or includes the frequency of the first cell and the identifier of the first cell. The first cell is the cell in which the first network device receives the RRC connection resume request message, or in other words, a cell on which the terminal device camps. The auxiliary information includes the information about the first cell. This helps the second network device to determine content of the RRC release message.

According to a fourth aspect, a fourth RRC connection resume method is provided. The method includes: A second network device receives a first message from a first network device, where the first message includes auxiliary information, the auxiliary information is used to indicate that the first network device cannot respond to an RRC connection resume request message from a terminal device, the first network device is a network device on which the terminal device camps, and the second network device is an anchor network device of the terminal device. The second network device generates an RRC release message, where the RRC release message includes information used by the terminal device to perform redirection and/or information used by the terminal device to perform cell reselection. The second network device sends the RRC release message to the first network device.

The method may be performed by a fourth communication apparatus. The fourth communication apparatus may be a communication device or a communication apparatus, for example, a chip, that can support a communication device in implementing a function in the method. For example, the fourth communication apparatus is the second network device, or a chip that is deployed in the second network device and configured to implement a function of the second network device, or another component configured to implement a function of the second network device. In the following description process, an example in which the fourth communication apparatus is the second network device is used.

In a possible implementation, that the auxiliary information is used to indicate that the first network device cannot respond to the RRC connection resume request message includes:

the auxiliary information includes first indication information, where the first indication information is used to indicate that the first network device cannot respond to the RRC connection resume request message.

In a possible implementation, the auxiliary information includes a cause for which the first network device cannot respond to the RRC connection resume request message.

In a possible implementation, the cause for which the first network device cannot respond to the RRC connection resume request message includes:

the first network device does not support a service indicated by the RRC connection resume request message; and/or a load quantity of the first network device is greater than a threshold.

In a possible implementation, the auxiliary information further includes a frequency of a first cell and/or an identifier of the first cell.

The first cell is a cell in which the first network device receives the RRC connection resume request message.

For technical effects brought by the fourth aspect or the possible implementations, refer to descriptions of the technical effects brought by the third aspect or the corresponding implementations.

According to a fifth aspect, a communication apparatus is provided. For example, the communication apparatus is the first communication apparatus described above. The first communication apparatus is configured to perform the method according to any one of the first aspect or the possible implementations. In some embodiments, the first communication apparatus may include modules configured to perform the method according to any one of the first aspect or the possible implementations, for example, include a processing module and a transceiver module. For example, the transceiver module may include a sending module and a receiving module. The sending module and the receiving module may be different functional modules, or may be a same functional module but can implement different functions. For example, the first communication apparatus is a communication device, or a chip or another component deployed in a communication device. For example, the communication device is a first network device. The following uses an example in which the first communication apparatus is the first network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. If the first communication apparatus is a communication device, the transceiver is implemented, for example, by using an antenna, a feeder, a codec, and the like in the communication device. Alternatively, if the first communication apparatus is a chip deployed in a communication device, the transceiver (or the transmitter and the receiver) is (are), for example, a communication interface in the chip. The communication interface is connected to a radio frequency transceiver component in the communication device, to implement information sending and receiving by using the radio frequency transceiver component. In a description process of the fifth aspect, the processing module, the sending module, the receiving module, and a case in which the first communication apparatus is the first network device are still used as examples for description.

The receiving module is configured to receive an RRC connection resume request message from a terminal device, where the RRC connection resume request message is used to request to resume an RRC connection of the terminal device, and the terminal device is in an RRC inactive state.

The sending module is configured to send a first message to a second network device, where the first message includes auxiliary information, the auxiliary information includes information used by the terminal device to perform redirection and/or information used by the terminal device to perform cell reselection, the first network device is a network device on which the terminal device camps, and the second network device is an anchor network device of the terminal device.

The receiving module is further configured to receive an RRC release message from the second network device, where the RRC release message includes the information used by the terminal device to perform redirection and/or the information used by the terminal device to perform cell reselection.

The sending module is further configured to send the RRC release message to the terminal device.

In a possible implementation, the information used by the terminal device to perform redirection includes one or more of the following:

information about a redirection frequency;

a subcarrier spacing corresponding to a redirection frequency reference signal; or time domain location information of a redirection frequency reference signal.

In a possible implementation, the information used by the terminal device to perform cell reselection includes:

priority information of a frequency used when the terminal device performs cell reselection.

For technical effects brought by the fifth aspect or the possible implementations, refer to the descriptions of the technical effects brought by the first aspect or the corresponding implementations.

According to a sixth aspect, a communication apparatus is provided. For example, the communication apparatus is the second communication apparatus described above. The second communication apparatus is configured to perform the method according to any one of the second aspect or the possible implementations. In some embodiments, the second communication apparatus may include modules configured to perform the method according to any one of the second aspect or the possible implementations, for example, include a processing module and a transceiver module. For example, the transceiver module may include a sending module and a receiving module. The sending module and the receiving module may be different functional modules, or may be a same functional module but can implement different functions. For example, the second communication apparatus is a communication device, or a chip or another component deployed in a communication device. For example, the communication device is a second network device. The following uses an example in which the second communication apparatus is the second network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. If the second communication apparatus is a communication device, the transceiver is implemented, for example, by using an antenna, a feeder, a codec, and the like in the communication device. Alternatively, if the second communication apparatus is a chip deployed in a communication device, the transceiver (or the transmitter and the receiver) is (are), for example, a communication interface in the chip. The communication interface is connected to a radio frequency transceiver component in the communication device, to implement information sending and receiving by using the radio frequency transceiver component. In a description process of the sixth aspect, the processing module, the sending module, the receiving module, and a case in which the second communication apparatus is the second network device are still used as examples for description.

The receiving module is configured to receive a first message from a first network device, where the first message includes auxiliary information, the auxiliary information includes information used by a terminal device to perform redirection and/or information used by the terminal device to perform cell reselection, the first network device is a network device on which the terminal device camps, and the second network device is an anchor network device of the terminal device.

The processing module is configured to generate an RRC release message, where the RRC release message includes the information used by the terminal device to perform redirection and/or the information used by the terminal device to perform cell reselection.

The sending module is configured to send the RRC release message to the first network device.

In a possible implementation, the information used by the terminal device to perform redirection includes one or more of the following:
  information about a redirection frequency;
  a subcarrier spacing corresponding to a redirection frequency reference signal; or
  time domain location information of a redirection frequency reference signal.

In a possible implementation, the information used by the terminal device to perform cell reselection includes:
  priority information of a frequency used when the terminal device performs cell reselection.

For technical effects brought by the sixth aspect or the possible implementations, refer to the descriptions of the technical effects brought by the second aspect or the corresponding implementations.

According to a seventh aspect, a communication apparatus is provided. For example, the communication apparatus is the third communication apparatus described above. The third communication apparatus is configured to perform the method according to any one of the third aspect or the possible implementations. In some embodiments, the third communication apparatus may include modules configured to perform the method according to any one of the third aspect or the possible implementations, for example, include a processing module and a transceiver module. For example, the transceiver module may include a sending module and a receiving module. The sending module and the receiving module may be different functional modules, or may be a same functional module but can implement different functions. For example, the third communication apparatus is a communication device, or a chip or another component deployed in a communication device. For example, the communication device is a first network device. The following uses an example in which the third communication apparatus is the first network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. If the third communication apparatus is a communication device, the transceiver is implemented, for example, by using an antenna, a feeder, a codec, and the like in the communication device. Alternatively, if the third communication apparatus is a chip deployed in a communication device, the transceiver (or the transmitter and the receiver) is (are), for example, a communication interface in the chip. The communication interface is connected to a radio frequency transceiver component in the communication device, to implement information sending and receiving by using the radio frequency transceiver component. In a description process of the seventh aspect, the processing module, the sending module, the receiving module, and a case in which the third communication apparatus is the first network device are still used as examples for description.

The receiving module is configured to receive an RRC connection resume request message from a terminal device, where the RRC resume request message is used to request to resume an RRC connection of the terminal device, and the terminal device is in an RRC inactive state.

The sending module is configured to send a first message to a second network device, where the first message includes auxiliary information, the auxiliary information is used to indicate that the first network device cannot respond to the RRC connection resume request message of the terminal device, the first network device is a network device on which the terminal device camps, and the second network device is an anchor network device of the terminal device.

The receiving module is further configured to receive an RRC release message from the second network device, where the RRC release message includes information used by the terminal device to perform redirection and/or information used by the terminal device to perform cell reselection.

The sending module is further configured to send the RRC release message to the terminal device.

In a possible implementation, that the auxiliary information is used to indicate that the first network device cannot respond to the RRC connection resume request message includes:

the auxiliary information includes first indication information, where the first indication information is used to indicate that the first network device cannot respond to the RRC connection resume request message.

In a possible implementation, the auxiliary information includes a cause for which the first network device cannot respond to the RRC connection resume request message.

In a possible implementation, the cause for which the first network device cannot respond to the RRC connection resume request message includes:
- the first network device does not support a service indicated by the RRC connection resume request message; and/or
- a load quantity of the first network device is greater than a threshold.

In a possible implementation, the auxiliary information further includes a frequency of a first cell and/or an identifier of the first cell.

The first cell is a cell in which the first network device receives the RRC connection resume request message.

For technical effects brought by the seventh aspect or the possible implementations, refer to descriptions of the technical effects brought by the third aspect or the corresponding implementations.

According to an eighth aspect, a communication apparatus is provided. For example, the communication apparatus is the fourth communication apparatus described above. The fourth communication apparatus is configured to perform the method according to any one of the fourth aspect or the possible implementations. In some embodiments, the fourth communication apparatus may include modules configured to perform the method according to any one of the fourth aspect or the possible implementations, for example, include a processing module and a transceiver module. For example, the transceiver module may include a sending module and a receiving module. The sending module and the receiving module may be different functional modules, or may be a same functional module but can implement different functions. For example, the fourth communication apparatus is a communication device, or a chip or another component deployed in a communication device. For example, the communication device is a second network device. The following uses an example in which the fourth communication apparatus is the second network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. If the fourth communication apparatus is a communication device, the transceiver is implemented, for example, by using an antenna, a feeder, a codec, and the like in the communication device. Alternatively, if the fourth communication apparatus is a chip deployed in a communication device, the transceiver (or the transmitter and the receiver) is (are), for example, a communication interface in the chip. The communication interface is connected to a radio frequency transceiver component in the communication device, to implement information sending and receiving by using the radio frequency transceiver component. In a description process of the eighth aspect, the processing module, the sending module, the receiving module, and a case in which the fourth communication apparatus is the second network device are still used as examples for description.

The receiving module is configured to receive a first message from a first network device, where the first message includes auxiliary information, the auxiliary information is used to indicate that the first network device cannot respond to an RRC connection resume request message from a terminal device, the first network device is a network device on which the terminal device camps, and the second network device is an anchor network device of the terminal device.

The processing module is configured to generate an RRC release message, where the RRC release message includes information used by the terminal device to perform redirection and/or information used by the terminal device to perform cell reselection.

The sending module is configured to send the RRC release message to the first network device.

In a possible implementation, that the auxiliary information is used to indicate that the first network device cannot respond to the RRC connection resume request message includes:
- the auxiliary information includes first indication information, where the first indication information is used to indicate that the first network device cannot respond to the RRC connection resume request message.

In a possible implementation, the auxiliary information includes a cause for which the first network device cannot respond to the RRC connection resume request message.

In a possible implementation, the cause for which the first network device cannot respond to the RRC connection resume request message includes:
- the first network device does not support a service indicated by the RRC connection resume request message; and/or
- a load quantity of the first network device is greater than a threshold.

In a possible implementation, the auxiliary information further includes a frequency of a first cell and/or an identifier of the first cell.

The first cell is a cell in which the first network device receives the RRC connection resume request message.

For technical effects brought by the eighth aspect or the possible implementations, refer to descriptions of the technical effects brought by the fourth aspect or the corresponding implementations.

According to a ninth aspect, a communication apparatus is provided. The communication apparatus is, for example, the first communication apparatus described above. The communication apparatus includes a processor. Optionally, the communication apparatus may further include a memory, configured to store computer instructions. The processor and the memory are coupled to each other, to implement the method according to the first aspect or the possible implementations. Alternatively, the first communication apparatus may not include a memory, and the memory may be located outside the first communication apparatus. Optionally, the first communication apparatus may further include a communication interface, configured to communicate with another apparatus or device. The processor, the memory, and the communication interface are coupled to each other, to implement the method according to the first aspect or the possible implementations. For example, when the processor executes the computer instructions stored in the memory, the first communication apparatus is enabled to perform the method according to any one of the first aspect or the possible implementations. For example, the first communication apparatus is a communication device, or a chip or another component deployed in a communication device. For example, the communication device is a first network device.

If the first communication apparatus is a communication device, the communication interface is implemented, for example, by using a transceiver (or a transmitter and a receiver) in the communication device. For example, the transceiver is implemented by using an antenna, a feeder, a codec, and the like in the communication device. Alternatively, if the first communication apparatus is a chip deployed in a communication device, the communication interface is, for example, an input/output interface such as an input/output pin of the chip. The communication interface is connected to a radio frequency transceiver component in the communication device, to implement information sending and receiving by using the radio frequency transceiver component.

According to a tenth aspect, a communication apparatus is provided. The communication apparatus is, for example, the second communication apparatus described above. The communication apparatus includes a processor. Optionally, the communication apparatus may further include a memory, configured to store computer instructions. The processor and the memory are coupled to each other, to implement the method according to the second aspect or the possible implementations. Alternatively, the second communication apparatus may not include a memory, and the memory may be located outside the second communication apparatus. Optionally, the second communication apparatus may further include a communication interface, configured to communicate with another apparatus or device. The processor, the memory, and the communication interface are coupled to each other, to implement the method according to the second aspect or the possible implementations. For example, when the processor executes the computer instructions stored in the memory, the second communication apparatus is enabled to perform the method according to any one of the second aspect or the possible implementations. For example, the second communication apparatus is a communication device, or a chip or another component deployed in a communication device. For example, the communication device is a second network device.

If the second communication apparatus is a communication device, the communication interface is implemented, for example, by using a transceiver (or a transmitter and a receiver) in the communication device. For example, the transceiver is implemented by using an antenna, a feeder, a codec, and the like in the communication device. Alternatively, if the second communication apparatus is a chip deployed in a communication device, the communication interface is, for example, an input/output interface such as an input/output pin of the chip. The communication interface is connected to a radio frequency transceiver component in the communication device, to implement information sending and receiving by using the radio frequency transceiver component.

According to an eleventh aspect, a communication apparatus is provided. The communication apparatus is, for example, the third communication apparatus described above. The communication apparatus includes a processor. Optionally, the communication apparatus may further include a memory, configured to store computer instructions. The processor and the memory are coupled to each other, to implement the method according to the third aspect or the possible implementations. Alternatively, the third communication apparatus may not include a memory, and the memory may be located outside the third communication apparatus. Optionally, the third communication apparatus may further include a communication interface, configured to communicate with another apparatus or device. The processor, the memory, and the communication interface are coupled to each other, to implement the method according to the third aspect or the possible implementations. For example, when the processor executes the computer instructions stored in the memory, the third communication apparatus is enabled to perform the method according to any one of the third aspect or the possible implementations. For example, the third communication apparatus is a communication device, or a chip or another component deployed in a communication device. For example, the communication device is a first network device.

If the third communication apparatus is a communication device, the communication interface is implemented, for example, by using a transceiver (or a transmitter and a receiver) in the communication device. For example, the transceiver is implemented by using an antenna, a feeder, a codec, and the like in the communication device. Alternatively, if the third communication apparatus is a chip deployed in a communication device, the communication interface is, for example, an input/output interface such as an input/output pin of the chip. The communication interface is connected to a radio frequency transceiver component in the communication device, to implement information sending and receiving by using the radio frequency transceiver component.

According to a twelfth aspect, a communication apparatus is provided. The communication apparatus is, for example, the fourth communication apparatus described above. The communication apparatus includes a processor. Optionally, the communication apparatus may further include a memory, configured to store computer instructions. The processor and the memory are coupled to each other, to implement the method according to the fourth aspect or the possible implementations. Alternatively, the fourth communication apparatus may not include a memory, and the memory may be located outside the fourth communication apparatus. Optionally, the fourth communication apparatus may further include a communication interface, configured to communicate with another apparatus or device. The processor, the memory, and the communication interface are coupled to each other, to implement the method according to the fourth aspect or the possible implementations. For example, when the processor executes the computer instructions stored in the memory, the fourth communication apparatus is enabled to perform the method according to any one of the fourth aspect or the possible implementations. For example, the fourth communication apparatus is a communication device, or a chip or another component deployed in a communication device. For example, the communication device is a second network device.

If the fourth communication apparatus is a communication device, the communication interface is implemented, for example, by using a transceiver (or a transmitter and a receiver) in the communication device. For example, the transceiver is implemented by using an antenna, a feeder, a codec, and the like in the communication device. Alternatively, if the fourth communication apparatus is a chip deployed in a communication device, the communication interface is, for example, an input/output interface such as an input/output pin of the chip. The communication interface is connected to a radio frequency transceiver component in the communication device, to implement information sending and receiving by using the radio frequency transceiver component.

According to a thirteenth aspect, a communication system is provided. The communication system includes the communication apparatus according to the fifth aspect or the communication apparatus according to the ninth aspect.

In an optional implementation, the communication system further includes the communication apparatus according to the sixth aspect or the communication apparatus according to the tenth aspect.

According to a fourteenth aspect, a communication system is provided. The communication system includes the communication apparatus according to the seventh aspect or the communication apparatus according to the eleventh aspect.

In an optional implementation, the communication system further includes the communication apparatus according to the eighth aspect or the communication apparatus according to the twelfth aspect.

The communication system according to the thirteenth aspect and the communication system according to the fourteenth aspect may be a same communication system, or may be different communication systems.

According to a fifteenth aspect, a computer-readable storage medium is provided. The computer-readable storage medium is configured to store computer instructions. When the computer instructions are run on a computer, the computer is enabled to perform the method according to any one of the first aspect or the possible implementations.

According to a sixteenth aspect, a computer-readable storage medium is provided. The computer-readable storage medium is configured to store computer instructions. When the computer instructions are run on a computer, the computer is enabled to perform the method according to any one of the second aspect or the possible implementations.

According to a seventeenth aspect, a computer-readable storage medium is provided. The computer-readable storage medium is configured to store computer instructions. When the computer instructions are run on a computer, the computer is enabled to perform the method according to any one of the third aspect or the possible implementations.

According to an eighteenth aspect, a computer-readable storage medium is provided. The computer-readable storage medium is configured to store computer instructions. When the computer instructions are run on a computer, the computer is enabled to perform the method according to any one of the fourth aspect or the possible implementations.

According to a nineteenth aspect, a computer program product including instructions is provided. The computer program product is configured to store the computer instructions. When the computer instructions are run on a computer, the computer is enabled to perform the method according to any one of the first aspect or the possible implementations.

According to a twentieth aspect, a computer program product including instructions is provided. The computer program product is configured to store the computer instructions. When the computer instructions are run on a computer, the computer is enabled to perform the method according to any one of the second aspect or the possible implementations.

According to a twenty-first aspect, a computer program product including instructions is provided. The computer program product is configured to store the computer instructions. When the computer instructions are run on a computer, the computer is enabled to perform the method according to any one of the third aspect or the possible implementations.

According to a twenty-second aspect, a computer program product including instructions is provided. The computer program product is configured to store the computer instructions. When the computer instructions are run on a computer, the computer is enabled to perform the method according to any one of the fourth aspect or the possible implementations.

In embodiments of this application, the RRC release message may be generated by the anchor network device of the terminal device, and does not need to be generated by the network device on which the terminal device currently camps. Therefore, the network device on which the terminal device currently camps may not need to transfer a context of the terminal device or the like to the network device, so that steps that need to be performed and a latency are reduced.

DESCRIPTION OF EMBODIMENTS

Figure 1:
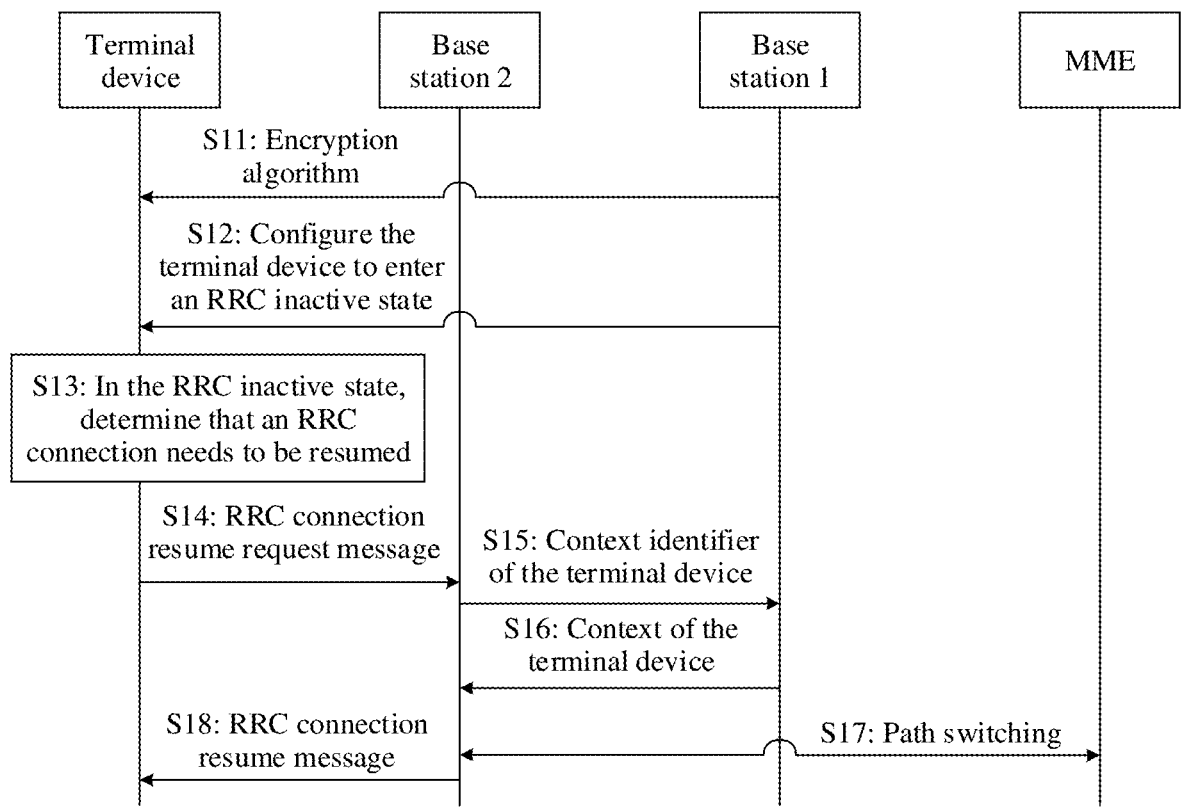
FIG. 1 is a flowchart of an RRC resume process.

To make objectives, technical solutions and advantages of embodiments of this application clearer, the following further describes embodiments of this application in detail with reference to the accompanying drawings.

In the following descriptions, some terms in embodiments of this application are described, to help a person skilled in the art have a better understanding.

(1) Terminal device: The terminal device includes a device that provides a voice and/or data connectivity for a user. The terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (RAN), and exchange a voice or data with the RAN, or exchange a voice and data with the RAN. The terminal device may include user equipment (UE), a wireless terminal device, a mobile terminal device, a device-to-device (D2D) communication terminal device, a vehicle-to-everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, hand-held, or computer built-in mobile apparatus. For example, the terminal device may include a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capacity, or a device with a limited computing capability. For example, the terminal device includes an information sensing device such as a barcode, radio frequency identification (RFID), a sensor, a global positioning system (GPS), or a laser scanner.

By way of example but not limitation, in embodiments of this application, the terminal device may also be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that is directly put on a body or is integrated into clothes or an accessory of a user. The wearable device is not merely a hardware device, and further implements a powerful function through software support, data exchange, and cloud interaction. In a broad sense, wearable intelligent devices include full-featured and large-sized devices that can implement all or some functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

In embodiments of this application, the terminal device may further include a relay. Alternatively, it may be understood that any device that can perform data communication with a base station may be considered as the terminal device.

In embodiments of this application, an apparatus configured to implement a function of a terminal device may be a terminal device, or may be an apparatus, for example, a chip system, that can support the terminal device in implementing the function. The apparatus may be installed in the terminal device. In embodiments of this application, the chip system may include a chip, or may include a chip and another discrete component. In the technical solutions provided in embodiments of this application, the technical solutions provided in embodiments of this application are described by using an example in which an apparatus for implementing a function of the terminal is the terminal device.

(2) Network device: The network device includes, for example, an access network (AN) device such as a base station (for example, an access point), and may be a device that communicates with a wireless terminal device through an air interface by using one or more cells in an access network. Alternatively, for example, the network device in a vehicle-to-everything (V2X) technology is a road side unit (RSU). The base station may be configured to perform mutual conversion between a received over-the-air frame and an IP packet, and serve as a router between a terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB) in a long term evolution (LTE) system or a long term evolution-advanced (LTE-A) system, may include a next generation NodeB (gNB) in a 5th generation (5G) mobile communication technology new radio (NR) system (also briefly referred to as an NR system), or may include a centralized unit (CU) and a distributed unit (DU) in a cloud radio access network (Cloud RAN) system. This is not limited in embodiments of this application.

The network device may further include a core network device, and the core network device includes, for example, an access and mobility management function (AMF). Embodiments of this application do not relate to a core network. Therefore, unless otherwise specified in the following specification, the network device refers to an access network device.

In embodiments of this application, an apparatus configured to implement a function of a network device may be a network device, or may be an apparatus, for example, a chip system, that can support the network device in implementing the function. The apparatus may be installed in the network device. In the technical solutions provided in embodiments of this application, the technical solutions provided in embodiments of this application are described by using an example in which an apparatus for implementing a function of the network device is the network device.

(3) RRC state: The terminal device has three RRC states: an RRC connected state, an RRC idle state, and an RRC inactive state.

RRC connected state (briefly referred to as a connected state, where the "connected state" and the "RRC connected state" are interchangeable concepts which convey a same meaning in this specification): The terminal device establishes an RRC connection to a network, so that data transmission can be performed.

RRC idle state (briefly referred to as an idle state, where the "idle state" and the "RRC idle state" are interchangeable concepts which convey a same meaning in this specification): The terminal device does not establish the RRC connection to the network, and a base station does not store a context of the terminal device. If the terminal device needs to enter the RRC connected state from the RRC idle state, the terminal device needs to initiate an RRC connection establishment process.

RRC inactive state (briefly referred to as an inactive state, where "inactivated state", "deactivated state", the "inactive state", the "RRC inactive state", "RRC deactivated state", and the like are interchangeable concepts which convey a same meaning in this specification): The terminal device previously enters the RRC connected state at an anchor base station, and then the anchor base station releases the RRC connection, but the anchor base station stores the context of the terminal device. If the terminal device needs to re-enter the RRC connected state from the RRC inactive state, the terminal device needs to initiate an RRC connection resume process (or referred to as an RRC connection reestablishment process) at a base station on which the terminal device currently camps. Because the terminal device may be in a moving state, the base station on which the terminal device currently camps and the anchor base station of the terminal device may be a same base station or different base stations. Compared with the RRC connection establishment process, the RRC connection resume process has a shorter latency and smaller signaling overheads. However, the base station needs to store the context of the terminal device, causing storage overheads of the base station.

(4) Terms: The terms "system" and "network" may be used interchangeably in embodiments of this application. "At least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" usually indicates an "or" relationship between the associated objects. "At least one item (piece) of the following" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, but are not intended to limit sizes, content, an order, a time sequence, priorities, importance degrees, or the like of the plurality of objects. For example, a first network device and a second network device are merely used to distinguish between different network devices, but do not indicate different priorities, importance, or the like of the two network devices.

Embodiments of this application may be applied to various communication systems, for example, an LTE system, an LTE-A system, an NR system, or a future possible communication system. This is not specifically limited.

The foregoing describes concepts of some names used in embodiments of this application. The following describes technical features of embodiments of this application.

In discussion of the 5G standard, it is agreed to introduce an RRC inactive state for a terminal device. The inactive state is more energy-saving compared with an RRC connected state, and a latency of accessing a network in the inactive state is shorter compared with that in an RRC idle state.

For example, the terminal device is in the RRC connected state at a base station. If no data is transmitted between the base station and the terminal device temporarily, or if there is another cause, the base station may control the terminal device to enter the RRC inactive state, and allocate, to the terminal device, a context ID, for example, an inactive cell radio network temporary identifier (I-RNTI), and a radio access network notification area (RNA). When the terminal device moves within the allocated RNA, it is unnecessary to notify the base station of a location of the terminal device until the terminal device moves out of the RNA. Alternatively, even if the terminal device moves within the allocated RNA, the terminal device needs to periodically notify the base station of the location of the terminal device. Such a manner is referred to as radio access network notification area update (RNAU).

If the terminal device needs to notify the base station of the location of the terminal device, the terminal device needs to perform an RRC resume process with the base station. In addition to the cause that the terminal device needs to notify the base station of the location of the terminal device, if the terminal device receives a paging message, the terminal device also needs to perform the RRC resume process with the base station. FIG. 1 shows a procedure of an RRC resume process.

S11: A base station 1 sends an encryption algorithm for communication to a terminal device, and the terminal device receives the encryption algorithm from the base station 1.

In this case, the terminal device is in an RRC connected state at the base station 1.

S12: The base station 1 configures the terminal device to enter an RRC inactive state.

For example, in S12, the base station 1 may send an RRC release message to the terminal device, and the terminal device receives the RRC release message from the base station 1. The RRC release message is for configuring the terminal device to enter the RRC inactive state. The RRC release message may carry information of the terminal device such as a context identifier, a key, and an RNA.

S13: The terminal device in the RRC inactive state determines that an RRC connection needs to be resumed.

S14: The terminal device sends an RRC connection resume request message to a base station 2, and the base station 2 receives the RRC connection resume request message from the terminal device.

The base station 1 is an anchor base station of the terminal device. However, because the terminal device is in a moving state, the terminal device has moved into coverage of the base station 2 when determining that the RRC connection needs to be resumed. In this case, the base station 2 is a base station on which the terminal device currently camps. Therefore, the terminal device sends the RRC connection resume request message to the base station 2. For example, both the base station 1 and the base station 2 are gNBs.

The RRC connection resume request message may carry the context identifier of the terminal device, and carry data encrypted based on the key obtained in S12 and the encryption algorithm obtained in S11.

S15: The base station 2 sends the context identifier of the terminal device to the base station 1, and the base station 1 receives the context identifier of the terminal device. The base station 2 sends the context identifier of the terminal device to the base station 1, to indicate the base station 1 to request to obtain a context of the terminal device.

The base station 2 may determine, based on the context identifier of the terminal device, a base station in which the context of the terminal device is located, namely, the base station 1. The base station 2 may request to the base station 1 to obtain the context of the terminal device.

S16: The base station 2 sends the context of the terminal device to the base station 1, and the base station 1 receives the context of the terminal device from the base station 2.

S15 and S16 may be considered as a process of transferring the context of the terminal device.

S17: Path switching is performed between the base station 2 and a core network device.

The core network device is, for example, an access and mobility management function entity (AMF). An objective of the path switching is to change a destination address of downlink data of the terminal device. Before the path switching is performed, the AMF sends the downlink data of the terminal device to the base station 1 according to an original path. However, the base station 2 has transferred the context of the terminal device from the base station 1 to the base station 2. Therefore, the base station 2 needs to notify the AMF to change the address of the downlink data of the terminal device to the address of the base station 2. After the path switching is completed, the AMF subsequently sends the downlink data of the terminal device to the base station 2.

S18: The base station 2 sends an RRC connection resume message to the terminal device, and the terminal device receives the RRC connection resume message from the base station 2.

The base station 2 obtains a corresponding key after performing S16. Therefore, the base station 2 performs encryption and integrity protection on the RRC connection resume message using the key.

After receiving the RRC connection resume message, the terminal device performs integrity protection verification and decryption on the RRC connection resume message based on a stored key. If the integrity protection verification and the decryption succeed, the terminal device restores the RRC connection to the base station 2, and may subsequently perform data transmission with the base station 2.

The procedure shown in FIG. 1 describes a process in which the terminal device successfully resumes the RRC connection. In some other cases, the base station may be unable to resume the RRC connection for the terminal device after receiving the RRC connection resume request message from the terminal device. For example, a cause for which the base station does not support resuming the RRC connection of the terminal device may be that the base station does not support a service indicated by the RRC connection resume request message of the terminal device, or that the base station has heavy load.

Figure 2:
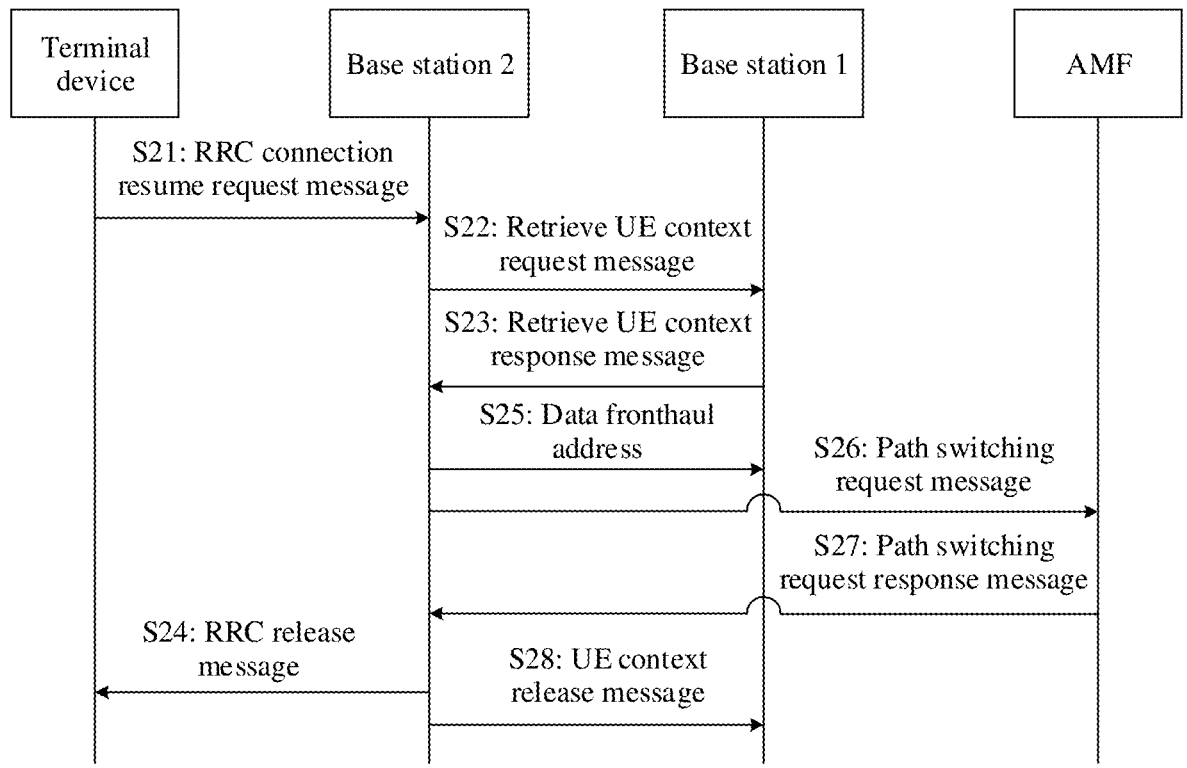
FIG. 2 is a flowchart of releasing a terminal device when a base station does not support resuming an RRC connection of the terminal device.

If the base station does not support resuming the RRC connection of the terminal device, the base station needs to release the terminal device. FIG. 2 shows a procedure of releasing a terminal device when a base station does not support resuming an RRC connection of the terminal device.

S21: The terminal device sends an RRC connection resume request message to a base station 2, and the base station 2 receives the RRC connection resume request message from the terminal device.

If the terminal device in an RRC inactive state needs to resume the RRC connection, the terminal device may send the RRC connection resume request message to a base station on which the terminal device camps. For example, the terminal device camps on the base station 2.

The RRC connection resume request message may carry a context identifier of the terminal device, such as an I-RNTI.

S22: The base station 2 sends a retrieve UE context request message to a base station 1, and the base station 1 receives the retrieve UE context request message from the base station 2. The retrieve UE context request is used to request to obtain a context of the terminal device.

The base station 2 determines, based on the I-RNTI included in the RRC connection resume request message, a base station in which the context of the terminal device is located, for example, the base station 1, and requests to the base station 1 to obtain the context of the terminal device.

For example, both the base station and the base station 2 are gNBs.

S23: The base station 1 sends a retrieve UE context response message to the base station 2, and the base station 2 receives the retrieve UE context response message from the base station 1.

After receiving the retrieve UE context request message from the base station 2, the base station 1 sends the context of the terminal device to the base station 2, and indicates a new key to the base station 2.

S24: The base station 2 sends an RRC release message to the terminal device, and the terminal device receives the RRC release message from the base station 2.

The base station 2 may encrypt the RRC release message using the new key obtained in S23, and the RRC release message sent by the base station 2 to the terminal device in S24 is an encrypted message. The RRC release message sent by the base station 2 to the terminal device in S24 may carry redirection information, to indicate the terminal device to perform redirection.

S25: The base station 2 sends a data fronthaul address indication to the base station 1, and the base station 1 receives the data fronthaul address indication from the base station 2.

Because the context of the terminal device is previously stored in the base station 1, all downlink data of the terminal device from a core network device is sent to the base station 1 before path switching is performed. Therefore, the base station 2 may notify the base station 1 of an address of the base station 2 based on the data fronthaul address indication, and the base station 1 may send the previously received downlink data of the terminal device to the base station 2.

S26: The base station 2 sends a path switching request message to the core network device, and the core network device receives the path switching request message from the base station 2.

The core network device is, for example, an access and mobility management function (AMF).

An objective of the path switching is to change a destination address of the downlink data of the terminal device. Before the path switching is performed, the AMF sends the downlink data of the terminal device to the base station 1 according to an original path. However, the base station 2 has transferred the context of the terminal device from the base station 1 to the base station 2. Therefore, the base station 2 needs to notify the AMF to change the address of the downlink data of the terminal device to the address of the base station 2. After the path switching is completed, the AMF subsequently sends the downlink data of the terminal device to the base station 2.

S27: The AMF sends a path switching request response to the base station 2, and the base station 2 receives the path switching request response message from the AMF.

By performing S26 and S27, the base station 2 changes the address of the downlink data of the terminal device from the base station 1 to the base station 2.

S24 is usually performed after S22, S23, S25, S26, and S27.

S28: The base station 2 sends a UE context release message to the base station 1, and the base station 1 receives the UE context release message from the base station 2.

After the foregoing work is completed, the base station 2 indicates the base station 1 to release the context of the terminal device.

In S24, the base station 2 indicates, in the RRC release message, the terminal device to perform redirection. In this case, after receiving the RRC release message, the terminal device may resume the RRC connection of the terminal device at a base station indicated by the redirection information. In other words, after redirecting to another base station, the terminal device needs to send the RRC connection resume request message to the base station, and then the base station needs to perform processes such as context transfer of the terminal device and path switching. However, because the base station 2 does not support the terminal device in resuming the RRC connection, the processes such as the context transfer of the terminal device and the path switching that are performed by the base station 2 are actually meaningless, consuming time, and increasing a latency of an RRC connection resumption process of the terminal device. In addition, this causes unnecessary signaling overheads, and wastes transmission resources.

In view of this, technical solutions of embodiments of this application are provided. In embodiments of this application, a first network device is a network device on which a terminal device currently camps, and a second network device is an anchor network device of the terminal device. After the network device on which the terminal device currently camps receives an RRC connection resume request message from the terminal device, if the network device expects to release the terminal device, the network device may request an anchor network device of the terminal device to generate an RRC release message, and the network device only needs to send the RRC release message to the terminal device. It can be learned that, according to the technical solutions provided in embodiments of this application, the RRC release message can be generated by the anchor network device of the terminal device, and does not need to be generated by the network device on which the terminal device currently camps. Therefore, the network device on which the terminal device currently camps may not need to transfer a context of the terminal device or the like to the network device. This reduces steps that need to be performed, reduces a latency, and reduces signaling overheads caused in processes such as context transfer. In addition, the first message may further include the auxiliary information, and the anchor network device may generate the release message based on the auxiliary information, so that information that needs to be determined by the anchor network device is reduced.

The technical solutions provided in embodiments of this application may be applied to a 4th generation (4G) mobile communication technology system, for example, an LTE system; a 5G system, for example, an NR system; or a next-generation mobile communication system or another similar communication system. This is not specifically limited.

Figure 3:
FIG. 3 is a schematic diagram of an application scenario according to an embodiment of this application.
Figure 3:
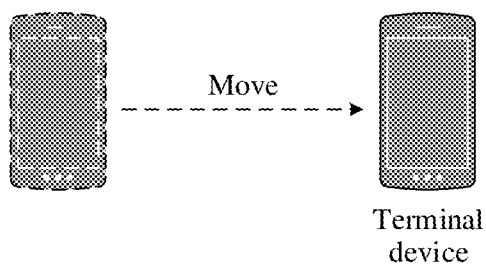

FIG. 3 is a schematic diagram of an application scenario according to an embodiment of this application. FIG. 3 includes a network device 1, a network device 2, and a terminal device. For example, the terminal device is initially in an RRC connected state at the network device 2, and then the terminal device is released by the network device 2, but a context of the terminal device 1 is stored in the network device 2. Subsequently, the terminal device moves into coverage of the network device 1, and the terminal device camps on the network device 1.

For example, the network device 1 works in an evolved universal mobile telecommunications system terrestrial radio access (E-UTRA) system, an NR system, or a next-generation communication system or another communication system. For example, the network device 2 works in the E-UTRA system, the NR system, or the next-generation communication system or another communication system. The network device 1 and the network device 2 may work in a same communication system, for example, both work in an E-UTRA system. Alternatively, the network device 1 and the network device 2 may work in different communication systems. For example, the network device 1 works in the E-UTRA system, and the network device 2 works in the NR system.

The network device in FIG. 3 is, for example, a base station. The network device corresponds to different devices in different systems. For example, the network device may correspond to an eNB in a 4G system, and correspond to a 5G access network device such as a gNB in a 5G system. Certainly, the technical solutions provided in embodiments of this application may also be applied to a future mobile communication system. Therefore, the network device in FIG. 3 may also correspond to a network device in the future mobile communication system. In FIG. 3, an example in which the network device is a base station is used. Actually, with reference to the foregoing descriptions, the network device may alternatively be a device such as an RSU. In addition, an example in which the terminal device in FIG. 3 is a mobile phone is used. Actually, it can be learned from the foregoing descriptions of the terminal device that the terminal device in embodiments of this application is not limited to the mobile phone.

Figure 4:
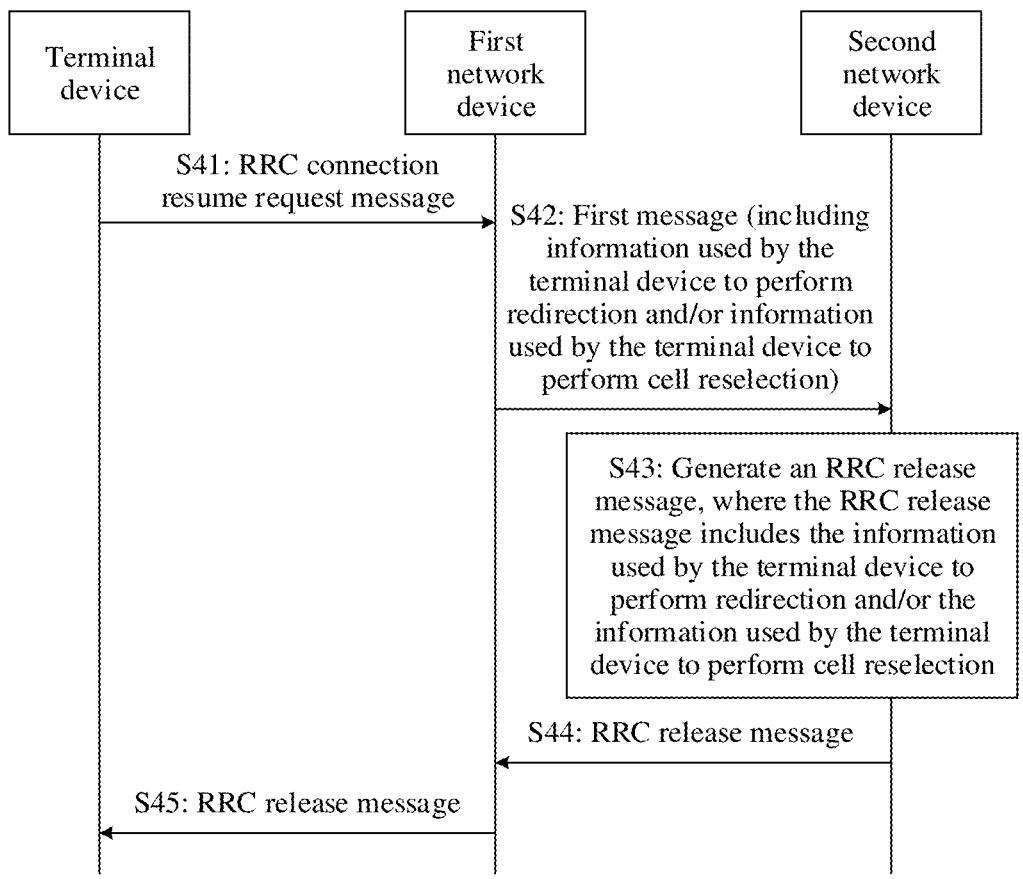
FIG. 4 is a flowchart of a first RRC connection resume method according to an embodiment of this application.

FIG. 4 is a flowchart of a first RRC connection resume method according to an embodiment of this application. The following provides descriptions using an example in which the method is applied to the network architecture shown in FIG. 3.

For ease of description, the following uses an example in which the method is performed by a network device and a terminal device. For example, this embodiment is applied to the network architecture shown in FIG. 3. Therefore, the first network device, the second network device, and the terminal device described below may be the network device 1, the network device 2, and the terminal device in the network architecture shown in FIG. 3, respectively.

S41: The terminal device sends an RRC connection resume request message to the first network device, and the first network device receives the RRC connection resume request message from the terminal device. The RRC connection resume request message is used to request to resume an RRC connection of the terminal device.

When performing S41, the terminal device is in an RRC inactive state. For example, the terminal device enters the RRC inactive state after being released by an anchor network device. The anchor network device of the terminal device may be a network device that releases the terminal device to the RRC inactive state, a network device that stores a context of the terminal device, or the like. For example, the anchor network device of the terminal device is the second network device. The second network device and the first network device may be a same network device, or may be different network devices. In this embodiment of this application, an example in which the second network device and the first network device are different network devices is mainly used.

If the terminal device needs to send a location of the terminal device to the first network device, or the terminal device receives a paging message, or the terminal device has to-be-transmitted information, the terminal device needs to perform an RRC resume process with the base station. In this case, S41 may be performed, and the terminal device sends the RRC connection resume request message to the first network device.

The RRC connection resume request message may carry a first cause value, and the first cause value may indicate a cause for which the terminal device requests to resume the RRC connection. For example, the cause indicated by the first cause value may be that the location of the terminal device needs to be sent to the first network device, for example, in a manner of RNAU, or that the terminal device receives the paging message, or that the terminal device has to-be-transmitted information.

S42: The first network device sends a first message to the second network device, and the second network device receives the first message from the first network device.

The first message may include auxiliary information. The auxiliary information may include information used by the terminal device to perform redirection, or include information used by the terminal device to perform cell reselection, or include information used by the terminal device to perform redirection and information used by the terminal device to perform cell reselection.

After receiving the RRC connection resume request message, the first network device determines, based on a corresponding factor, whether to support the terminal device in resuming the RRC connection. For example, if the first network device has heavy load, the first network device may not support the terminal device in resuming the RRC connection. Alternatively, the RRC connection resume request message may indicate a first service, where the first service is a service that needs to be performed by the terminal device after the RRC connection is resumed, but the first network device does not support the first service. In this case, the first network device may not support the terminal device in resuming the RRC connection. Certainly, the first network device may alternatively determine, based on another factor, whether to support the terminal device in resuming the RRC connection. The factor used by the first network device for determining is not limited in this embodiment of this application.

If the first network device supports the terminal device in resuming the RRC connection, the first network device may request the context of the terminal device from the second network device. For an example process, refer to the procedure shown in FIG. 1. Alternatively, if the first network device does not support the terminal device in resuming the RRC connection, the first network device may send the first message to the second network device.

That the first message includes the information used by the terminal device to perform redirection and/or the information used by the terminal device to perform cell reselection is equivalent to indicating that the first network device does not support the terminal device in resuming the RRC connection, or indicating that the first network device is going to release the terminal device. In this manner, the first message does not need to carry additional indication information. The included information used by the terminal device to perform redirection and/or information used by the terminal device to perform cell reselection not only provide information for the second network device, but also implicitly indicate that the first network device does not support the terminal device in resuming the RRC connection, or indicate that the first network device is going to release the terminal device. Alternatively, in addition to the auxiliary information, the first message may further include indication information, or the auxiliary information may further include indication information. The indication information indicates that the first network device does not support the terminal device in resuming the RRC connection, or indicates that the first network device is going to release the terminal device. Using the explicit indication manner helps the second network device more clearly know a meaning of sending the first message by the first network device, and more clearly know processing that should be performed by the second network device.

In this embodiment of this application, the information used by the terminal device to perform redirection may include one or more of the following: information about a redirection frequency, a subcarrier spacing corresponding to a redirection frequency reference signal, or time domain location information of the redirection frequency reference signal. For example, the information used by the terminal device to perform redirection may include the information about the redirection frequency; or the subcarrier spacing corresponding to the redirection frequency reference signal and the time domain location information of the redirection frequency reference signal; or the information about the redirection frequency, the subcarrier spacing corresponding to the redirection frequency reference signal, and the time domain location information of the redirection frequency reference signal.

The redirection frequency may include one or more frequencies. After obtaining the information about the redirection frequency, the terminal device may measure the one or more frequencies, to redirect to a cell at these frequencies. The redirection frequency reference signal may refer to a reference signal transmitted at the redirection frequency.

The time domain location information of the redirection frequency reference signal may be time domain location information of an SSB signal at the redirection frequency. The time domain location information may be represented by using an SSB measurement timing configuration (smtc). The smtc configuration includes parameters such as a period, an offset, and duration. A representation form of the time domain location information of the redirection frequency reference signal is not limited in this embodiment of this application.

The information used by the terminal device to perform cell reselection may include priority information of a frequency used when the terminal device performs cell reselection. For example, the information used by the terminal device to perform cell reselection may include priority information of a frequency 1 and priority information of a frequency 2. For example, a priority of the frequency 1 is higher than a priority of the frequency 2. In this case, when performing cell reselection, for example, the terminal device may first measure a higher-priority frequency and then measure a lower-priority frequency, that is, first measure the frequency 1 and then measure the frequency 2. Alternatively, the terminal device performs measurement without distinguishing. However, if there are cells that meet a reselection condition at both the higher-priority frequency and the lower-priority frequency, the terminal device may reselect a cell on the higher-priority frequency. For example, if the terminal device determines through measurement that a cell 1 at the frequency 1 meets the reselection condition, and that a cell 2 at the frequency 2 also meets the reselection condition, the terminal device may reselect the cell 1.

In an optional manner, the first message may be a retrieve UE context request, and the retrieve UE context request message includes the auxiliary information in this embodiment of this application. Alternatively, another message may be reused as the first message, or the first message may be a newly added dedicated message. An implementation of the first message is not limited.

S43: The second network device generates an RRC release message. The RRC release message includes information used by the terminal device to perform redirection, or includes information used by the terminal device to perform cell reselection, or includes information used by the terminal device to perform redirection and information used by the terminal device to perform cell reselection.

For example, the RRC release message may also include auxiliary information, and the auxiliary information included in the RRC release message may be the same as the auxiliary information included in the first message. In other words, the first network device sends the auxiliary information to the second network device, and the second network device adds the auxiliary information to the RRC release message, with no need to additionally determine the information used by the terminal device to perform redirection, the information used by the terminal device to perform cell reselection, or the like. Because the first network device is a network device on which the terminal device currently camps, determining the information by the first network device can make a determining result more accurate compared with determining the information by the second network device.

Alternatively, the information included in the RRC release message may be different from the auxiliary information included in the first message. For example, the auxiliary information included in the first message includes the information used by the terminal device to perform redirection but does not include the information used by the terminal device to perform cell reselection, while the RRC release message includes both the information used by the terminal device to perform redirection and the information used by the terminal device to perform cell reselection. Alternatively, the auxiliary information included in the first message includes the information used by the terminal device to perform redirection and the information used by the terminal device to perform cell reselection, while the RRC release message includes the information used by the terminal device to perform cell reselection but does not include the information used by the terminal device to perform redirection. Alternatively, the auxiliary information included in the first message includes the information used by the terminal device to perform redirection and the information used by the terminal device to perform cell reselection, and the RRC release message includes the information used by the terminal device to perform redirection and the information used by the terminal device to perform cell reselection. However, the information used by the terminal device to perform redirection included in the auxiliary information includes the information about the redirection frequency but does not include the subcarrier spacing corresponding to the redirection frequency reference signal. The information used by the terminal device to perform redirection included in the RRC release message includes the information about the redirection frequency and the subcarrier spacing corresponding to the redirection frequency reference signal.

If the information included in the RRC release message is different from the auxiliary information included in the first message, the second network device may further determine, based on another factor in addition to the auxiliary information, the information included in the RRC release message. In this way, the information included in the RRC release message is more comprehensive.

In this embodiment of this application, the first network device needs to release the terminal device to the RRC inactive state. Therefore, the RRC release message may include a suspension configuration. For example, the information used by the terminal device to perform redirection and/or the information used by the terminal device to perform cell reselection included in the RRC release message may be included in the suspension configuration.

For example, the first message may further include state notification information. The state notification information is used to indicate a state to which the terminal device is to be released. For example, the state notification information may indicate to release the terminal device to the RRC inactive state or an RRC idle state. In this way, the second network device can determine, based on the state notification information, whether to release the terminal device to the RRC inactive state or the RRC idle state.

Alternatively, the first message may not need to indicate the state to which the terminal device is to be released, but the second network device autonomously determines whether to release the terminal device to the RRC inactive state or the RRC idle state.

Regardless of whether the second network device determines, based on the first message, the state to which the terminal device is to be released, or autonomously determines the state to which the terminal device is to be released, if the second network device determines to release the terminal device to the RRC inactive state, the suspension configuration may be carried in the RRC release message; or if the second network device determines to release the terminal device to the RRC idle state, the suspension configuration may not be carried in the RRC release message.

The RRC release message in S43 may be a message that is integrity protected and encrypted by the second network device. The second network device stores the context of the terminal device, and therefore also stores a key used to encrypt the RRC release message. In this case, the second network device may integrity protect and encrypt the RRC release message based on the stored key. For example, the second network device may integrity protect and encrypt the RRC release message based on a packet data convergence protocol (PDCP) configuration in the context of the terminal device.

S44: The second network device sends the RRC release message to the first network device, and the first network device receives the RRC release message from the second network device.

After obtaining the integrity protected and encrypted RRC release message, the second network device may send the RRC release message to the first network device.

S45: The first network device sends the RRC release message to the terminal device, and the terminal device receives the RRC release message from the first network device.

The RRC release message received by the terminal device is the integrity protected and encrypted message. The terminal device may perform integrity protection verification and decryption on the RRC release message based on a key stored by the terminal device. Because the terminal device receives the RRC release message from the first network device, if the integrity protection verification and decryption succeed, the terminal device is determined to be released by the first network device.

If determining that the RRC release message includes the suspension configuration, the terminal device determines to enter the RRC inactive state. If determining that the RRC release message does not include the suspension configuration, the terminal device determines to enter the RRC idle state. In this embodiment of this application, the RRC release message includes the suspension configuration, and the terminal device enters the RRC inactive state.

If the RRC release message includes the information used by the terminal device to perform redirection, the terminal device may be redirected to another cell based on the information used by the terminal device to perform redirection. Alternatively, if the RRC release message includes the information used by the terminal device to perform cell reselection, the terminal device may perform cell reselection based on the information used by the terminal device to perform cell reselection, to reselect another cell. Alternatively, if the RRC release message includes both the information used by the terminal device to perform redirection and the information used by the terminal device to perform cell reselection, the terminal device may perform measurement based on the information about the redirection frequency included in the information used by the terminal device to perform redirection, and perform cell reselection based on the information used by the terminal device to perform cell reselection. For example, the terminal device may finally select a better cell.

After entering a new cell, the terminal device may initiate an RRC connection resume process to the cell. The information used by the terminal device to perform redirection should be reliable because it is determined by the first network device or the second network device. Therefore, when the terminal device initiates the RRC connection resume process in the cell, there is a high probability that the cell supports the terminal device in resuming an RRC connection. In this case, the terminal device initiates the RRC connection resume process in the cell. For the process, refer to the procedure shown in FIG. 2. Alternatively, if the cell does not support the terminal device in resuming the RRC connection either, the procedure shown in FIG. 4 may be performed again. After the procedure is performed, the terminal device may perform an operation such as cell reselection or redirection.

In this embodiment of this application, the first network device is a network device on which the terminal device currently camps, and the second network device is an anchor network device of the terminal device. After the network device on which the terminal device currently camps receives the RRC connection resume request message from the terminal device, if the network device expects to release the terminal device, the network device may request the anchor network device of the terminal device to generate the RRC release message, and the network device only needs to send the RRC release message to the terminal device. It can be learned that, according to the technical solution provided in this embodiment of this application, the RRC release message may be generated by the anchor network device of the terminal device, and does not need to be generated by the network device on which the terminal device currently camps. Therefore, the network device on which the terminal device currently camps may not need to transfer the context of the terminal device or the like to the network device, so that steps that need to be performed, a latency, and signaling overheads caused in interaction processes such as context transfer are reduced. In addition, the first message may further include the auxiliary information, and the anchor network device may generate the release message based on the auxiliary information, so that information that needs to be determined by the anchor network device is reduced.

Moreover, the first network device sends priority information of a frequency used when redirection and/or cell reselection are/is performed to the second network device, and the second network device adds the priority information of the frequency used when redirection and/or cell reselection are/is performed to the RRC release message, with no need to additionally determine the information used by the terminal device to perform redirection, the information used by the terminal device to perform cell reselection, or the like. Because the first network device is a network device on which the terminal device currently camps, determining the information by the first network device can make a determining result more accurate compared with determining the information by the second network device.

Figure 5:
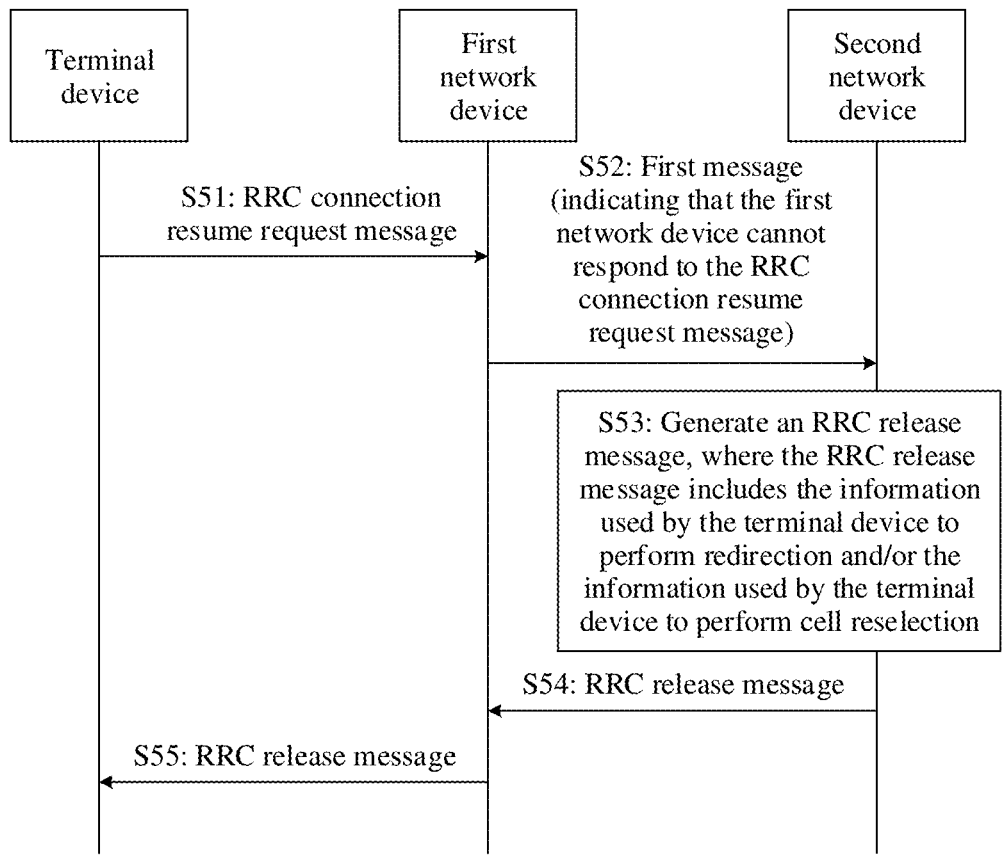
FIG. 5 is a flowchart of a second RRC connection resume method according to an embodiment of this application.

To resolve the same technical problem, FIG. 5 is a flowchart of a second RRC connection resume method according to an embodiment of this application. The following provides descriptions using an example in which the method is applied to the network architecture shown in FIG. 3.

For ease of description, the following uses an example in which the method is performed by a network device and a terminal device. For example, this embodiment is applied to the network architecture shown in FIG. 3. Therefore, the first network device, the second network device, and the terminal device described below may be the network device 1, the network device 2, and the terminal device in the network architecture shown in FIG. 3, respectively.

S51: The terminal device sends an RRC connection resume request message to the first network device, and the first network device receives the RRC connection resume request message from the terminal device. The RRC connection resume request message is used to request to resume an RRC connection of the terminal device.

When performing SM, the terminal device is in an RRC inactive state. For more descriptions of SM, refer to the descriptions of S41 in the embodiment shown in FIG. 4.

S52: The first network device sends a first message to the second network device, and the second network device receives the first message from the first network device.

The first message may include auxiliary information, and the auxiliary information indicates that the first network device cannot respond to the RRC connection resume request message from the terminal device.

After receiving the RRC connection resume request message, the first network device determines, based on a corresponding factor, whether to support the terminal device in resuming the RRC connection. For example, if the first network device has heavy load, the first network device may not support the terminal device in resuming the RRC connection. Alternatively, the RRC connection resume request message may indicate a first service, where the first service is a service that needs to be performed by the terminal device after the RRC connection is resumed, but the first network device does not support the first service. In this case, the first network device may not support the terminal device in resuming the RRC connection. Certainly, the first network device may alternatively determine, based on another factor, whether to support the terminal device in resuming the RRC connection. The factor used by the first network device for determining is not limited in this embodiment of this application.

If the first network device supports the terminal device in resuming the RRC connection, the first network device may request the context of the terminal device from the second network device. For an example process, refer to the procedure shown in FIG. 1. Alternatively, if the first network device does not support the terminal device in resuming the RRC connection, the first network device may send the first message to the second network device.

In an optional manner, the first message may be a retrieve UE context request, and the retrieve UE context request message includes the auxiliary information in this embodiment of this application. Alternatively, another message may be reused as the first message, or the first message may be a newly added dedicated message. An implementation of the first message is not limited.

The auxiliary information included in the first message may indicate that the first network device cannot respond to the RRC connection resume request message from the terminal device. For example, an indication manner is that the auxiliary information includes first indication information, and the first indication information may indicate that the first network device cannot respond to the RRC connection resume request message from the terminal device.

If an existing message is reused as the first message, for example, the first message is a retrieve UE context request, for example, the first indication information occupies one bit. If a value of the one bit is "1", it indicates that the first network device can respond to the RRC connection resume request message from the terminal device. If a value of the one bit is "0", it indicates that the first network device cannot respond to the RRC connection resume request message from the terminal device. Alternatively, if the first message includes the first indication information, it indicates that the first network device cannot respond to the RRC connection resume request message from the terminal device; if the first message does not include the first indication information, it indicates that the first network device can respond to the RRC connection resume request message from the terminal device.

Alternatively, if the first message is a dedicated message newly added in this embodiment of this application, if the first network device can respond to the RRC connection resume request message from the terminal device, the first network device may not need to send the first message to the second network device. The first network device sends the first message to the second network device only when the first network device cannot respond to the RRC connection resume request message from the terminal device. If the first network device sends the first message to the second network device, the first message may include the first indication information, indicating that the first network device cannot respond to the RRC connection resume request message from the terminal device, or indicating that the first network device releases the terminal device.

The auxiliary information included in the first message may indicate that the first network device cannot respond to the RRC connection resume request message from the terminal device. For example, another indication manner is that the auxiliary information includes a second cause value, and the second cause value may indicate the cause for which the first network device cannot respond to the RRC connection resume request message. The cause for which the first network device cannot respond to the RRC connection resume request is, for example, that the first network device does not support the service indicated by the RRC connection resume request message, or that the first network device has heavy load (for example, the load quantity of the first network device is greater than a threshold). The threshold may be configured by the first network device or a core network device, or may be protocol-specified.

If an existing message is reused as the first message, for example, the first message is a retrieve UE context request, if the first network device cannot respond to the RRC connection resume request message from the terminal device, the second cause value may be included in the first message; if the first network device can respond to the RRC connection resume request message from the terminal device, the second cause value does not need to be included in the first message.

Alternatively, if the first message is a dedicated message newly added in this embodiment of this application, if the first network device can respond to the RRC connection resume request message from the terminal device, the first network device may not need to send the first message to the second network device. The first network device sends the first message to the second network device only when the first network device cannot respond to the RRC connection resume request message from the terminal device. If the first network device sends the first message to the second network device, the first message may include the second cause value.

For example, the auxiliary information may include the first indication information, but does not include the second cause value. Using the first indication information can already indicate that the first network device cannot respond to the RRC connection resume request message from the terminal device, achieving e indication purpose and reducing signaling overheads. Alternatively, the auxiliary information may include the second cause value, but does not include the first indication information. Using the second cause value can indicate that the first network device cannot respond to the RRC connection resume request message from the terminal device, and also indicate the cause for which the first network device cannot respond to the RRC connection resume request message from the terminal device. A larger amount of content can be indicated by using one piece of information, with no need to send more information. This helps reduce signaling overheads. Alternatively, the auxiliary information includes both the first indication information and the second cause value. The first indication information indicates that the first network device cannot respond to the RRC connection resume request message from the terminal device, and the second cause value indicates the cause for which the first network device cannot respond to the RRC connection resume request message from the terminal device. Different content is indicated using different information, making the indication clearer.

In an optional manner, the auxiliary information may further include information about a first cell. For example, the information about the first cell includes a frequency of the first cell, or includes an identifier of the first cell, or includes the frequency of the first cell and the identifier of the first cell. The first cell is the cell in which the first network device receives the RRC connection resume request message, or in other words, a cell on which the terminal device camps. The auxiliary information includes the information about the first cell. This helps the second network device to determine content of the RRC release message.

S53: The second network device generates an RRC release message. The RRC release message includes first information, and the first information may include information used by the terminal device to perform redirection, or include information used by the terminal device to perform cell reselection, or include information used by the terminal device to perform redirection and information used by the terminal device to perform cell reselection.

In this embodiment of this application, the first information is determined by the second network device. For example, the second network device may determine the first information based on content included in the first message. If the first information includes the information used by the terminal device to perform redirection, for descriptions of the information used by the terminal device to perform redirection, refer to the related descriptions of S43 in the embodiment shown in FIG. 4. If the first information includes the information used by the terminal device to perform cell reselection, for descriptions of the information used by the terminal device to perform cell reselection, refer to the related descriptions of S43 in the embodiment shown in FIG. 4.

Content included in the first information may be autonomously determined by the second network device. For example, the second network device determines that the first information includes the information used by the terminal device to perform redirection, but does not include the information used by the terminal device to perform cell reselection, or that the first information includes both the information used by the terminal device to perform redirection and the information used by the terminal device to perform cell reselection.

Alternatively, content included in the first information may be indicated by the first network device. For example, the first network device includes second indication information, and the second indication information may indicate that the RRC release message includes the information used by the terminal device to perform redirection, or includes the information used by the terminal device to perform cell reselection, or includes both the information used by the terminal device to perform redirection and the information used by the terminal device to perform cell reselection.

For example, content included in the first information generated by the second network device may completely comply with the indication of the second indication information. Information that needs to be included and that is indicated by the second indication information is included in the first information. Information that is not included and that is indicated by the second indication information or information that is not indicated by the second indication information is not included in the first information. For example, if the second indication information indicates that the RRC release message includes the information used by the terminal device to perform redirection, when the second network device generates the first information, the first information may include the information used by the terminal device to perform redirection, but does not include the information used by the terminal device to perform cell reselection.

Alternatively, content included in the first information generated by the second network device may not completely comply with the indication of the second indication information. Information that needs to be included and that is indicated by the second indication information is included in the first information. Information not indicated by the second indication information may be not included in the first information, or may be included in the first information. For example, if the second indication information indicates that the RRC release message includes the information used by the terminal device to perform redirection, when the second network device generates the first information, the first information may include the information used by the terminal device to perform redirection, but does not include the information used by the terminal device to perform cell reselection; or the first information may include both the information used by the terminal device to perform redirection and the information used by the terminal device to perform cell reselection.

The first network device indicates the content included in the RRC release message, so that the content included in the RRC release message is more pertinent.

In this embodiment of this application, the first network device needs to release the terminal device to the RRC inactive state. Therefore, the RRC release message may include a suspension configuration. For example, the first information included in the RRC release message may be included in the suspension configuration.

For example, the first message may further include state notification information. The state notification information is used to indicate a state to which the terminal device is to be released. For example, the state notification information may indicate to release the terminal device to the RRC inactive state or an RRC idle state. In this way, the second network device can determine, based on the state notification information, whether to release the terminal device to the RRC inactive state or the RRC idle state.

Alternatively, the first message may not need to indicate the state to which the terminal device is to be released, but the second network device autonomously determines whether to release the terminal device to the RRC inactive state or the RRC idle state.

Regardless of whether the second network device determines, based on the first message, the state to which the terminal device is to be released, or autonomously determines the state to which the terminal device is to be released, if the second network device determines to release the terminal device to the RRC inactive state, the suspension configuration may be carried in the RRC release message; or if the second network device determines to release the terminal device to the RRC idle state, the suspension configuration may not be carried in the RRC release message.

The RRC release message in S53 may be a message that is integrity protected and encrypted by the second network device. The second network device stores the context of the terminal device, and therefore also stores a key used to encrypt the RRC release message. In this case, the second network device may integrity protect and encrypt the RRC release message based on the stored key. For example, the second network device may integrity protect and encrypt the RRC release message based on a PDCP configuration in the context of the terminal device.

S54: The second network device sends the RRC release message to the first network device, and the first network device receives the RRC release message from the second network device.

After obtaining the integrity protected and encrypted RRC release message, the second network device may send the RRC release message to the first network device.

S55: The first network device sends the RRC release message to the terminal device, and the terminal device receives the RRC release message from the first network device.

The RRC release message received by the terminal device is the integrity protected and encrypted message. The terminal device may perform integrity protection verification and decryption on the RRC release message based on a key stored by the terminal device. Because the terminal device receives the RRC release message from the first network device, if the integrity protection verification and decryption succeed, the terminal device is determined to be released by the first network device.

If determining that the RRC release message includes the suspension configuration, the terminal device determines to enter the RRC inactive state. If determining that the RRC release message does not include the suspension configuration, the terminal device determines to enter the RRC idle state. In this embodiment of this application, the RRC release message includes the suspension configuration, and the terminal device enters the RRC inactive state.

For more content of S55, refer to the descriptions of S45 in the embodiment shown in FIG. 4.

In this embodiment of this application, the first network device is a network device on which the terminal device currently camps, and the second network device is an anchor network device of the terminal device. After the network device on which the terminal device currently camps receives the RRC connection resume request message from the terminal device, if the network device expects to release the terminal device, the network device may request the anchor network device of the terminal device to generate the RRC release message, and the network device only needs to send the RRC release message to the terminal device. It can be learned that, according to the technical solution provided in this embodiment of this application, the RRC release message may be generated by the anchor network device of the terminal device, and does not need to be generated by the network device on which the terminal device currently camps. Therefore, the network device on which the terminal device currently camps may not need to transfer the context of the terminal device or the like to the network device, so that steps that need to be performed, a latency, and signaling overheads caused in interaction processes such as context transfer are reduced. In addition, the first message may further include the auxiliary information, and the anchor network device may generate the release message based on the auxiliary information, so that information that needs to be determined by the anchor network device is reduced.

In addition, content included in the RRC release message may be determined by the second network device. Because the second network device stores the context of the terminal device, the second network device can accordingly determine the RRC release message. However, since the first network device has decided to release the terminal device, the first network device may not need to do much work, so that load of the first network device can be reduced.

The following describes apparatuses for implementing the foregoing methods in embodiments of this application with reference to the accompanying drawings. Therefore, all the foregoing content may be used in the following embodiments. Repeated content is not described again.

Figure 6:
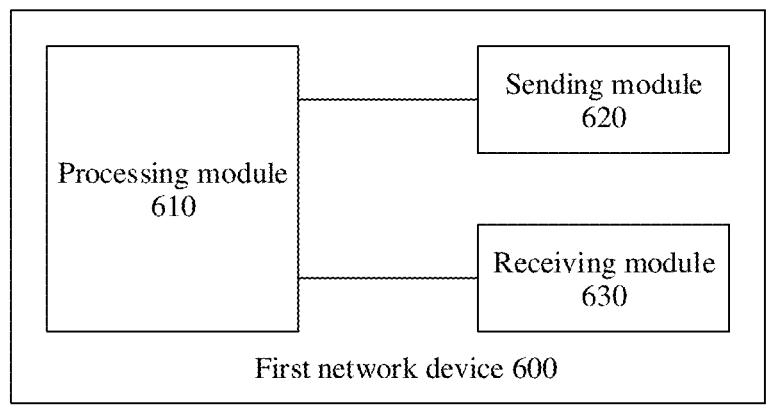
FIG. 6 is a schematic block diagram of a first type of first network device according to an embodiment of this application.

FIG. 6 is a schematic block diagram of a communication apparatus 600 according to an embodiment of this application. For example, the communication apparatus 600 is a first network device 600.

The first network device 600 includes a sending module 620 and a receiving module 630. Optionally, the first network device 600 may further include a processing module 610. For example, the first network device 600 may be a first network device, or may be a chip used in a first network device or another combined part, component, or the like having a function of the foregoing first network device. When the first network device 600 is a first network device, the sending module 620 may be a transmitter; the receiving module 630 may be a receiver, where the transmitter or the receiver may include an antenna, a radio frequency circuit, and the like; and the processing module 610 may be a processor, where the processor may include one or more central processing units (CPUs). When the first network device 600 is a component having a function of the foregoing first network device, the sending module 620 and the receiving module 630 may be a radio frequency unit, and the processing module 610 may be a processor. When the first network device 600 is a chip system, the sending module 620 and the receiving module 630 may be an input/output interface of the chip, and the processing module 610 may be a processor in the chip system, and may include one or more central processing units.

The processing module 610 may be configured to perform all operations other than sending and receiving operations performed by the first network device in the embodiment shown in FIG. 4, for example, an operation of determining to release a terminal device, and/or another process used to support the technology described in this specification. The sending module 620 may be configured to perform all sending operations performed by the first network device in the embodiment shown in FIG. 4, for example, S42 and S45, and/or another process used to support the technology described in this specification. The receiving module 630 may be configured to perform all receiving operations performed by the first network device in the embodiment shown in FIG. 4, for example, S41 and S44, and/or another process used to support the technology described in this specification.

In addition, the sending module 620 and the receiving module 630 may be one functional module. The functional module can complete both a sending operation and a receiving operation. The functional module may be referred to as a transceiver module. For example, the transceiver module may be configured to perform all sending operations and receiving operations performed by the first network device in the embodiment shown in FIG. 5. For example, when a sending operation is performed, the transceiver module may be considered as a sending module; and when a receiving operation is performed, the transceiver module may be considered as a receiving module. Alternatively, the sending module 620 and the receiving module 630 may be two functional modules. The transceiver module may be considered as an umbrella term of the two functional modules. The two functional modules are the sending module 620 and the receiving module 630. The sending module 620 is configured to complete a sending operation. For example, the sending module 620 may be configured to perform all sending operations performed by the first network device in the embodiment shown in FIG. 4. The receiving module 630 is configured to complete a receiving operation. For example, the receiving module 630 may be configured to perform all receiving operations performed by the first network device in the embodiment shown in FIG. 4.

The receiving module 630 is configured to receive an RRC connection resume request message from a terminal device, where the RRC connection resume request message is used to request to resume an RRC connection of the terminal device, and the terminal device is in an RRC inactive state.

The sending module 620 is configured to send a first message to a second network device, where the first message includes auxiliary information, the auxiliary information includes information used by the terminal device to perform redirection and/or information used by the terminal device to perform cell reselection, the first network device 600 is a network device on which the terminal device camps, and the second network device is an anchor network device of the terminal device.

The receiving module 630 is further configured to receive an RRC release message from the second network device, where the RRC release message includes the information used by the terminal device to perform redirection and/or the information used by the terminal device to perform cell reselection.

The sending module 620 is further configured to send the RRC release message to the terminal device.

In an optional implementation, the information used by the terminal device to perform redirection includes one or more of the following:

information about a redirection frequency;

a subcarrier spacing corresponding to a redirection frequency reference signal; or time domain location information of a redirection frequency reference signal.

In an optional implementation, the information used by the terminal device to perform cell reselection includes:

priority information of a frequency used when the terminal device performs cell reselection.

Figure 7:
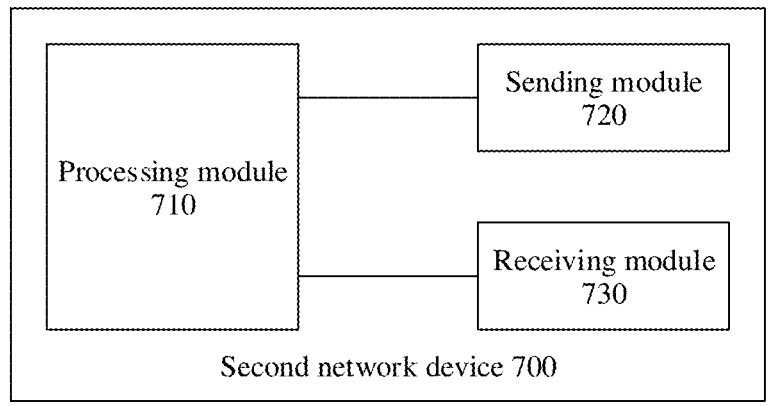
FIG. 7 is a schematic block diagram of a first type of second network device according to an embodiment of this application.

FIG. 7 is a schematic block diagram of a communication apparatus 700 according to an embodiment of this application. For example, the communication apparatus 700 is a second network device 700.

The second network device 700 includes a processing module 710, a sending module 720, and a receiving module 730. For example, the second network device 700 may be a second network device, or may be a chip used in a second network device or another combined part, component, or the like having a function of the foregoing second network device. When the second network device 700 is a second network device, the sending module 720 may be a transmitter; the receiving module 730 may be a receiver, where the transmitter or the receiver may include an antenna, a radio frequency circuit, and the like; and the processing module 710 may be a processor, where the processor may include one or more CPUs. When the second network device 700 is a component having a function of the foregoing second network device, the sending module 720 and the receiving module 730 may be a radio frequency unit, and the processing module 710 may be a processor. When the second network device 700 is a chip system, the sending module 720 and the receiving module 730 may be an input/output interface of the chip, and the processing module 710 may be a processor in the chip system, and may include one or more central processing units.

The processing module 710 may be configured to perform all operations other than sending and receiving operations performed by the second network device in the embodiment shown in FIG. 4, for example, S43 and/or another process used to support the technology described in this specification. The sending module 720 may be configured to perform all sending operations performed by the second network device in the embodiment shown in FIG. 4, for example, S44 and/or another process used to support the technology described in this specification. The receiving module 730 may be configured to perform all receiving operations performed by the second network device in the embodiment shown in FIG. 4, for example, S42 and/or another process used to support the technology described in this specification.

In addition, the sending module 720 and the receiving module 730 may be one functional module. The functional module can complete both a sending operation and a receiving operation. The functional module may be referred to as a transceiver module. For example, the transceiver module may be configured to perform all sending operations and receiving operations performed by the second network device in the embodiment shown in FIG. 5. For example, when a sending operation is performed, the transceiver module may be considered as a sending module; and when a receiving operation is performed, the transceiver module may be considered as a receiving module. Alternatively, the sending module 720 and the receiving module 730 may be two functional modules. The transceiver module may be considered as an umbrella term of the two functional modules. The two modules are the sending module 720 and the receiving module 730. The sending module 720 is configured to complete a sending operation. For example, the sending module 720 may be configured to perform all sending operations performed by the second network device in the embodiment shown in FIG. 4. The receiving module 730 is configured to complete a receiving operation. For example, the receiving module 730 may be configured to perform all receiving operations performed by the second network device in the embodiment shown in FIG. 4.

The receiving module 730 is configured to receive a first message from a first network device, where the first message includes auxiliary information, the auxiliary information includes information used by a terminal device to perform redirection and/or information used by the terminal device to perform cell reselection, the first network device is a network device on which the terminal device camps, and the second network device 700 is an anchor network device of the terminal device.

The processing module 710 is configured to generate an RRC release message, where the RRC release message includes the information used by the terminal device to perform redirection and/or the information used by the terminal device to perform cell reselection.

The sending module 720 is configured to send the RRC release message to the first network device.

In an optional implementation, the information used by the terminal device to perform redirection includes one or more of the following:

information about a redirection frequency;

a subcarrier spacing corresponding to a redirection frequency reference signal; or time domain location information of a redirection frequency reference signal.

In an optional implementation, the information used by the terminal device to perform cell reselection includes:

priority information of a frequency used when the terminal device performs cell reselection.

Figure 8:
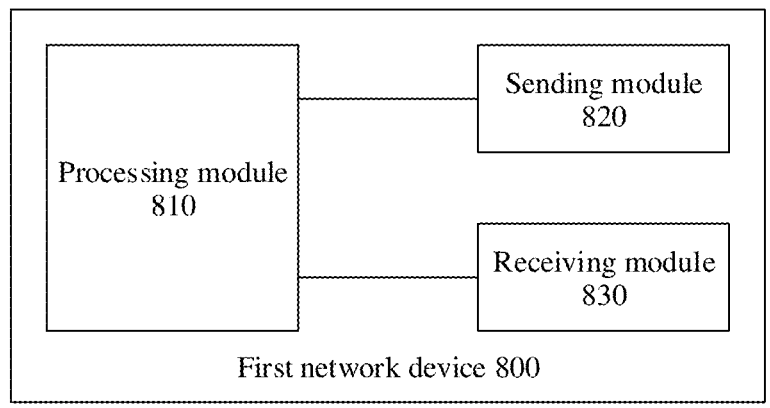
FIG. 8 is a schematic block diagram of a second type of first network device according to an embodiment of this application.

FIG. 8 is a schematic block diagram of a communication apparatus 800 according to an embodiment of this application. For example, the communication apparatus 800 is a first network device 800.

The first network device 800 includes a sending module 820 and a receiving module 830. Optionally, the first network device 800 may further include a processing module 810. For example, the first network device 800 may be a first network device, or may be a chip used in a first network device or another combined part, component, or the like that having a function of the foregoing first network device. When the first network device 800 is a first network device, the sending module 820 may be a transmitter; the receiving module 830 may be a receiver, where the transmitter or the receiver may include an antenna, a radio frequency circuit, and the like; and the processing module 810 may be a processor, where the processor may include one or more CPUs. When the first network device 800 is a component having a function of the foregoing first network device, the sending module 820 and the receiving module 830 may be a radio frequency unit, and the processing module 810 may be a processor. When the first network device 800 is a chip system, the sending module 820 and the receiving module 830 may be an input/output interface of the chip, and the processing module 810 may be a processor in the chip system, and may include one or more central processing units.

The processing module 810 may be configured to perform all operations other than sending and receiving operations performed by the first network device in the embodiment shown in FIG. 5, for example, an operation of determining to release a terminal device, and/or another process used to support the technology described in this specification. The sending module 820 may be configured to perform all sending operations performed by the first network device in the embodiment shown in FIG. 5, for example, S52 and S55, and/or another process used to support the technology described in this specification. The receiving module 830 may be configured to perform all receiving operations performed by the first network device in the embodiment shown in FIG. 5, for example, S51 and S54, and/or another process used to support the technology described in this specification.

In addition, the sending module 820 and the receiving module 830 may be one functional module. The functional module can complete both a sending operation and a receiving operation. The functional module may be referred to as a transceiver module. For example, the transceiver module may be configured to perform all sending operations and receiving operations performed by the first network device in the embodiment shown in FIG. 5. For example, when a sending operation is performed, the transceiver module may be considered as a sending module; and when a receiving operation is performed, the transceiver module may be considered as a receiving module. Alternatively, the sending module 820 and the receiving module 830 may be two functional modules. The transceiver module may be considered as an umbrella term of the two functional modules. The two functional modules are the sending module 820 and the receiving module 830. The sending module 820 is configured to complete a sending operation. For example, the sending module 820 may be configured to perform all sending operations performed by the first network device in the embodiment shown in FIG. 5. The receiving module 830 is configured to complete a receiving operation. For example, the receiving module 830 may be configured to perform all receiving operations performed by the first network device in the embodiment shown in FIG. 5.

The receiving module 830 is configured to receive an RRC connection resume request message from a terminal device, where the RRC resume request message is used to request to resume an RRC connection of the terminal device, and the terminal device is in an RRC inactive state.

The sending module 820 is configured to send a first message to a second network device, where the first message includes auxiliary information, the auxiliary information is used to indicate that the first network device cannot respond to the RRC connection resume request message of the terminal device, the first network device 800 is a network device on which the terminal device camps, and the second network device is an anchor network device of the terminal device.

The receiving module 830 is further configured to receive an RRC release message from the second network device, where the RRC release message includes information used by the terminal device to perform redirection and/or information used by the terminal device to perform cell reselection.

The sending module 820 is further configured to send the RRC release message to the terminal device.

In an optional implementation, that the auxiliary information is used to indicate that the first network device 800 cannot respond to the RRC connection resume request message includes:

the auxiliary information includes first indication information, where the first indication information is used to indicate that the first network device 800 cannot respond to the RRC connection resume request message.

In an optional implementation, the auxiliary information includes a cause for which the first network device 800 cannot respond to the RRC connection resume request message.

In an optional implementation, the cause for which the first network device 800 cannot respond to the RRC connection resume request message includes:

the first network device 800 does not support a service indicated by the RRC connection resume request message; and/or a load quantity of the first network device 800 is greater than a threshold.

In an optional implementation, the auxiliary information further includes a frequency of a first cell and/or an identifier of the first cell.

The first cell is a cell in which the first network device 800 receives the RRC connection resume request message.

Figure 9:
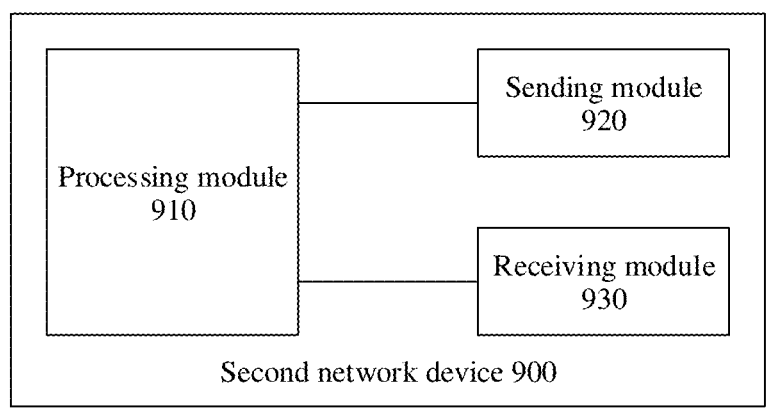
FIG. 9 is a schematic block diagram of a second type of second network device according to an embodiment of this application.

FIG. 9 is a schematic block diagram of a communication apparatus 900 according to an embodiment of this application. For example, the communication apparatus 900 is a second network device 900.

The second network device 900 includes a processing module 910, a sending module 920, and a receiving module 930. For example, the second network device 900 may be a second network device, or may be a chip used in a second network device or another combined part, component, or the like having a function of the foregoing second network device. When the second network device 900 is a second network device, the sending module 920 may be a transmitter; the receiving module 930 may be a receiver, where the transmitter or the receiver may include an antenna, a radio frequency circuit, and the like; and the processing module 910 may be a processor, where the processor may include one or more CPUs. When the second network device 900 is a component having a function of the foregoing second network device, the sending module 920 and the receiving module 930 may be a radio frequency unit, and the processing module 910 may be a processor. When the second network device 900 is a chip system, the sending module 920 and the receiving module 930 may be an input/output interface of the chip, and the processing module 910 may be a processor in the chip system, and may include one or more central processing units.

The processing module 910 may be configured to perform all operations other than sending and receiving operations performed by the second network device in the embodiment shown in FIG. 5, for example, S53 and/or another process used to support the technology described in this specification. The sending module 920 may be configured to perform all sending operations performed by the second network device in the embodiment shown in FIG. 5, for example, S54 and/or another process used to support the technology described in this specification. The receiving module 930 may be configured to perform all receiving operations performed by the second network device in the embodiment shown in FIG. 5, for example, S52 and/or another process used to support the technology described in this specification.

In addition, the sending module 920 and the receiving module 930 may be one functional module. The functional module can complete both a sending operation and a receiving operation. The functional module may be referred to as a transceiver module. For example, the transceiver module may be configured to perform all sending operations and receiving operations performed by the second network device in the embodiment shown in FIG. 5. For example, when a sending operation is performed, the transceiver module may be considered as a sending module; and when a receiving operation is performed, the transceiver module may be considered as a receiving module. Alternatively, the sending module 920 and the receiving module 930 may be two functional modules. The transceiver module may be considered as an umbrella term of the two functional modules. The two functional modules are the sending module 920 and the receiving module 930. The sending module 920 is configured to complete a sending operation. For example, the sending module 920 may be configured to perform all sending operations performed by the second network device in the embodiment shown in FIG. 5. The receiving module 730 is configured to complete a receiving operation. For example, the receiving module 730 may be configured to perform all receiving operations performed by the second network device in the embodiment shown in FIG. 5.

The receiving module 930 is configured to receive a first message from a first network device, where the first message includes auxiliary information, the auxiliary information is used to indicate that the first network device cannot respond to an RRC connection resume request message from a terminal device, the first network device is a network device on which the terminal device camps, and the second network device 900 is an anchor network device of the terminal device.

The processing module 910 is configured to generate an RRC release message, where the RRC release message includes information used by the terminal device to perform redirection and/or information used by the terminal device to perform cell reselection.

The sending module 920 is configured to send the RRC release message to the first network device.

In an optional implementation, that the auxiliary information is used to indicate that the first network device cannot respond to the RRC connection resume request message includes:
  the auxiliary information includes first indication information, where the first indication information is used to indicate that the first network device cannot respond to the RRC connection resume request message.

In an optional implementation, the auxiliary information includes a cause for which the first network device cannot respond to the RRC connection resume request message.

In an optional implementation, the cause for which the first network device cannot respond to the RRC connection resume request message includes:
  the first network device does not support a service indicated by the RRC connection resume request message; and/or
  a load quantity of the first network device is greater than a threshold.

In an optional implementation, the auxiliary information further includes a frequency of a first cell and/or an identifier of the first cell.

The first cell is a cell in which the first network device receives the RRC connection resume request message.

Figure 10:
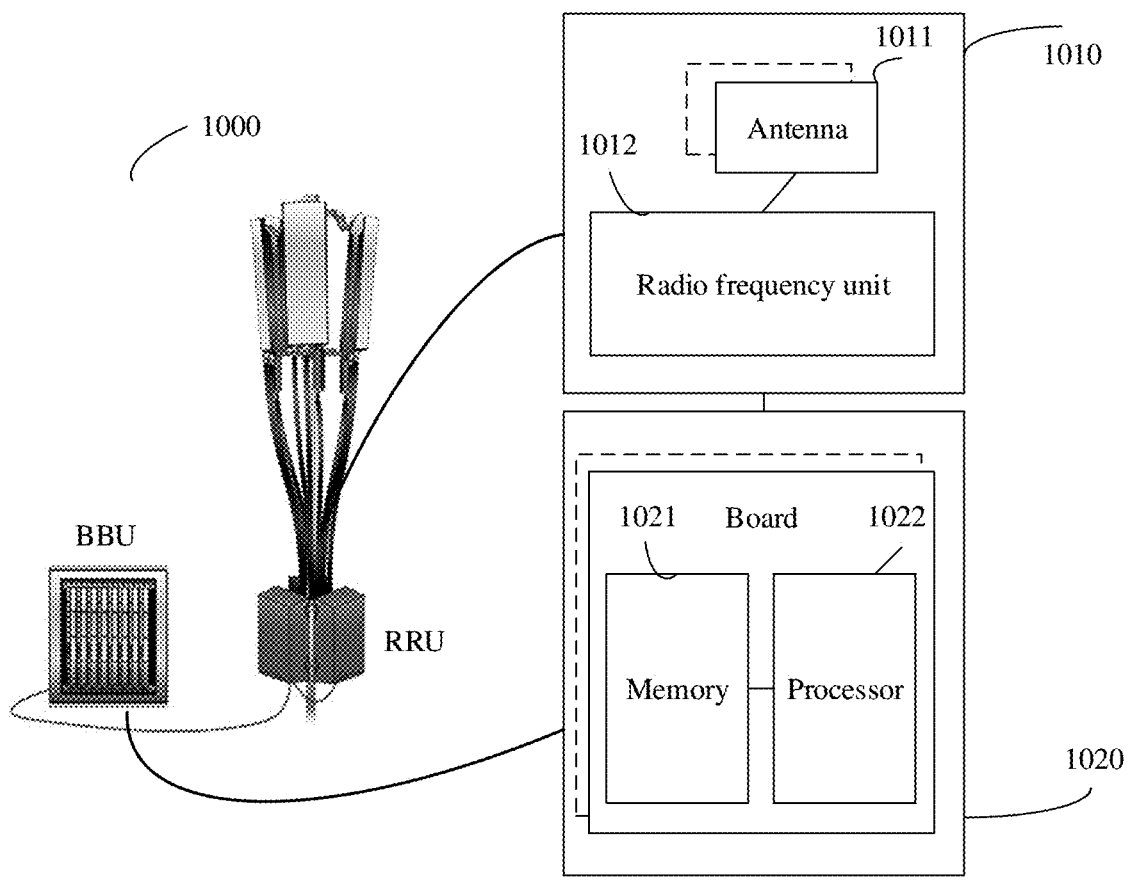
FIG. 10 is a schematic block diagram of a communication apparatus according to an embodiment of this application.

When the apparatus in this embodiment of this application is a network device, the apparatus may be as shown in FIG. 10. The apparatus 1000 includes one or more radio frequency units, such as a remote radio unit (RRU) 1010 and one or more baseband units (BBUs) (which may also be referred to as digital units (DUs)) 1020. The RRU 1010 may be referred to as a transceiver module, and the transceiver module may include a sending module and a receiving module. The sending module corresponds to the sending module 620 in FIG. 6, and the receiving module corresponds to the receiving module 630 in FIG. 6. Alternatively, the sending module corresponds to the sending module 720 in FIG. 7, and the receiving module corresponds to the receiving module 730 in FIG. 7. Alternatively, the sending module corresponds to the sending module 820 in FIG. 8, and the receiving module corresponds to the receiving module 830 in FIG. 8. Alternatively, the sending module corresponds to the sending module 920 in FIG. 9, and the receiving module corresponds to the receiving module 930 in FIG. 9. Optionally, the transceiver module may also be referred to as a transceiver machine, a transceiver circuit, a transceiver, or the like, and may include at least one antenna 1011 and a radio frequency unit 1012. The RRU 1010 is mainly configured to: send and receive a radio frequency signal, and perform conversion between the radio frequency signal and a baseband signal. For example, the RRU 1010 is configured to send indication information to a terminal device. The BBU 1010 is mainly configured to perform baseband processing, control a base station, and the like. The RRU 1010 and the BBU 1020 may be physically disposed together, or may be physically disposed separately. In some embodiments, the base station is a distributed base station.

The BBU 1020 is a control center of the base station, which may also be referred to as a processing module. The BBU 1020 may correspond to the processing module 610 in FIG. 6, may correspond to the processing module 710 in FIG. 7, may correspond to the processing module 810 in FIG. 8, or may correspond to the processing module 910 in FIG. 9. The BBU 1020 is mainly configured to implement baseband processing functions such as channel encoding, multiplexing, modulation, and spectrum spreading. For example, the BBU (the processing module) may be configured to control the base station to perform an operation procedure related to the network device in the foregoing method embodiments, for example, generate the foregoing indication information.

In an example, the BBU 1020 may include one or more boards, and a plurality of boards may jointly support a radio access network (for example, an LTE network) in a single access standard, or may separately support radio access networks (for example, an LTE network, a 5G network, and another network) in different access standards. The BBU 1020 further includes a memory 1021 and a processor 1022. The memory 1021 is configured to store instructions and data. The processor 1022 is configured to control the base station to perform an action, for example, control the base station to perform the operation procedure related to the network device in the foregoing method embodiments. The memory 1021 and the processor 1022 may serve one or more boards. In other words, a memory and a processor may be deployed on each board. Alternatively, a plurality of boards may share a same memory and a same processor. In addition, a circuit may further be deployed on each board.

An embodiment of this application provides a first communication system. The first communication system may include the first network device in the embodiment shown in FIG. 4. The first network device is, for example, the first network device 600 in FIG. 6 or the apparatus 1000 in FIG. 10.

Optionally, the first communication system may alternatively include the second network device in the embodiment shown in FIG. 4. The second network device is, for example, the second network device 700 in FIG. 7 or the apparatus 1000 in FIG. 10.

An embodiment of this application provides a second communication system. The second communication system may include the first network device in the embodiment shown in FIG. 5. The first network device is, for example, the first network device 800 in FIG. 8 or the apparatus 1000 in FIG. 10.

Optionally, the second communication system may alternatively include the second network device in the embodiment shown in FIG. 5. The second network device is, for example, the second network device 900 in FIG. 9 or the apparatus 1000 in FIG. 10.

The first communication system and the second communication system may be a same communication system, or may be different communication systems.

An embodiment of this application further provides a computer-readable storage medium. The computer-readable storage medium is configured to store a computer program. When the computer program is executed by a computer, the computer may implement a procedure related to the first network device provided in the method embodiment shown in FIG. 4.

An embodiment of this application further provides a computer-readable storage medium. The computer-readable storage medium stores a computer program. When the computer program is executed by a computer, the computer may implement a procedure related to the second network device provided in the method embodiment shown in FIG. 4.

An embodiment of this application further provides a computer-readable storage medium. The computer-readable storage medium is configured to store a computer program. When the computer program is executed by a computer, the computer may implement a procedure related to the first network device provided in the method embodiment shown in FIG. 5.

An embodiment of this application further provides a computer-readable storage medium. The computer-readable storage medium stores a computer program. When the computer program is executed by a computer, the computer may implement a procedure related to the second network device provided in the method embodiment shown in FIG. 5.

An embodiment of this application further provides a computer program product. The computer program product is configured to store a computer program. When the computer program is executed by a computer, the computer may implement a procedure related to the first network device provided in the method embodiment shown in FIG. 4.

An embodiment of this application further provides a computer program product. The computer program product is configured to store a computer program. When the computer program is executed by a computer, the computer may implement a procedure related to the second network device provided in the method embodiment shown in FIG. 4.

An embodiment of this application further provides a computer program product. The computer program product is configured to store a computer program. When the computer program is executed by a computer, the computer may implement a procedure related to the first network device provided in the method embodiment shown in FIG. 5.

An embodiment of this application further provides a computer program product. The computer program product is configured to store a computer program. When the computer program is executed by a computer, the computer may implement a procedure related to the second network device provided in the method embodiment shown in FIG. 5.

It should be understood that the processor mentioned in embodiments of this application may be a CPU, or may be another general-purpose processor, a digital signal processor (DSP), an application-specific integrated circuit ( ), a field programmable gate array (FPGA) or another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that, when the processor is a general-purpose processor, a DSP, an ASIC, an FPGA or another programmable logic device, a discrete gate or a transistor logic device, or a discrete hardware assembly, the memory (storage module) is integrated in the processor.

It should be noted that the memory described in this specification is intended to include, but is not limited to, these memories and any other appropriate types of memories.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one position, or may be distributed on a plurality of network units. Some or all of the units may be selected to achieve the objectives of the solutions of various embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely example implementations of this application, but are not intended to limit the protection scope of embodiments of this application. Any variation or replacement readily figured out by a person skilled in the art within the technical scope disclosed in embodiments of this application shall fall in the protection scope of embodiments of this application. Therefore, the protection scope of embodiments of this application shall be subject to the protection scope of the claims.

What is claimed is:

1. A radio resource control (RRC) connection resume method, comprising:
receiving, by a first network device, an RRC connection resume request message from a terminal device, wherein the RRC connection resume request message is used to request to resume an RRC connection of the terminal device, and the terminal device is in an RRC inactive state;
sending, by the first network device, a first message to a second network device, wherein
the first message comprises auxiliary information,
the auxiliary information comprises at least one of information used by the terminal device to perform redirection or information used by the terminal device to perform cell reselection, and the auxiliary information comprises an indication that the first network device cannot respond to the RRC connection resume request message of the terminal device,
the terminal device camps on the first network device, and
the second network device is an anchor network device of the terminal device;
receiving, by the first network device, an RRC release message from the second network device, wherein the RRC release message comprises at least one of the information used by the terminal device to perform redirection or the information used by the terminal device to perform cell reselection; and
sending, by the first network device, the RRC release message to the terminal device.

2. The method according to claim 1, wherein the information used by the terminal device to perform redirection comprises one or more of:
information about a redirection frequency;
a subcarrier spacing corresponding to a redirection frequency reference signal; or
time domain location information of a redirection frequency reference signal.

3. The method according to claim 1, wherein the information used by the terminal device to perform cell reselection comprises:
priority information of a frequency used when the terminal device performs cell reselection.

4. The method according to claim 1, wherein the auxiliary information comprises the information used by the terminal device to perform redirection, the information used by the terminal device to perform cell reselection, and the indication that the first network device cannot respond to the RRC connection resume request message.

5. The method according to claim 1, wherein the auxiliary information further comprises a cause for which the first network device cannot respond to the RRC connection resume request message.

6. A radio resource control (RRC) connection resume method, comprising:
receiving, by a first network device, a first message from a second network device, wherein
the first message comprises auxiliary information,
the auxiliary information comprises at least one of information used by a terminal device to perform redirection or information used by the terminal device to perform cell reselection, and the auxiliary information comprises an indication that the second network device cannot respond to an RRC connection resume request message from the terminal device,
the terminal device camps on the second network device, and
the first network device is an anchor network device of the terminal device;
generating, by the first network device, an RRC release message, wherein the RRC release message comprises at least one of the information used by the terminal device to perform redirection or the information used by the terminal device to perform cell reselection; and
sending, by the first network device, the RRC release message to the second network device.

7. The method according to claim 6, wherein the information used by the terminal device to perform redirection comprises one or more of:
information about a redirection frequency;
a subcarrier spacing corresponding to a redirection frequency reference signal; or
time domain location information of a redirection frequency reference signal.

8. The method according to claim 6, wherein the information used by the terminal device to perform cell reselection comprises:
priority information of a frequency used when the terminal device performs cell reselection.

9. The method according to claim 6, wherein
the auxiliary information comprises the information used by the terminal device to perform redirection, the information used by the terminal device to perform cell reselection, and the indication that the second network device cannot respond to the RRC connection resume request message.

10. The method according to claim 6, wherein the auxiliary information further comprises a cause for which the second network device cannot respond to the RRC connection resume request message.

11. A communication apparatus, comprising:
a processor; and
a memory having instructions stored thereon that, when executed by the processor, cause the communication apparatus to:
receive a radio resource control (RRC) connection resume request message from a terminal device, wherein the RRC connection resume request message is used to request to resume an RRC connection of the terminal device, and the terminal device is in an RRC inactive state;
send a first message to a network device, wherein
the first message comprises auxiliary information,
the auxiliary information comprises at least one of information used by the terminal device to perform redirection or information used by the terminal device to perform cell reselection, and the auxiliary information comprises an indication that the communication apparatus cannot respond to the RRC connection resume request message of the terminal device,
the terminal device camps on the communication apparatus, and
the network device is an anchor network device of the terminal device;
receive an RRC release message from the network device, wherein the RRC release message comprises the at least one of information used by the terminal device to perform redirection or the information used by the terminal device to perform cell reselection; and
send the RRC release message to the terminal device.

12. The communication apparatus according to claim 11, wherein the information used by the terminal device to perform redirection comprises one or more of:
information about a redirection frequency;
a subcarrier spacing corresponding to a redirection frequency reference signal; or
time domain location information of a redirection frequency reference signal.

13. The communication apparatus according to claim 11, wherein the information used by the terminal device to perform cell reselection comprises:
priority information of a frequency used when the terminal device performs cell reselection.

14. The communication apparatus according to claim 11, wherein the auxiliary information comprises the information used by the terminal device to perform redirection, the information used by the terminal device to perform cell reselection, and the indication that the communication apparatus cannot respond to the RRC connection resume request message.

15. The communication apparatus according to claim 11, wherein the auxiliary information further comprises a cause for which the communication apparatus cannot respond to the RRC connection resume request message.

16. A communication apparatus, comprising
a processor; and
a memory having instructions stored thereon that, when executed by the processor, cause the communication apparatus to:
receive a first message from a network device, wherein
the first message comprises auxiliary information,
the auxiliary information comprises at least one of information used by a terminal device to perform redirection or information used by the terminal device to perform cell reselection, and the auxiliary information comprises an indication that the network device cannot respond to a radio resource control (RRC) connection resume request message from a terminal device,
the terminal device camps on the network device, and
the communication apparatus is an anchor network device of the terminal device;
generate an RRC release message, wherein the RRC release message comprises at least one of the information used by the terminal device to perform redirection or the information used by the terminal device to perform cell reselection; and
send the RRC release message to the network device.

17. The communication apparatus according to claim 16, wherein the information used by the terminal device to perform redirection comprises one or more of:
information about a redirection frequency;
a subcarrier spacing corresponding to a redirection frequency reference signal; or
time domain location information of a redirection frequency reference signal.

18. The communication apparatus according to claim 16, wherein the information used by the terminal device to perform cell reselection comprises:
priority information of a frequency used when the terminal device performs cell reselection.

19. The communication apparatus according to claim 16, wherein the auxiliary information comprises the information used by the terminal device to perform redirection, the information used by the terminal device to perform cell reselection, and the indication that the network device cannot respond to the RRC connection resume request message.

20. The communication apparatus according to claim 16, wherein the auxiliary information further comprises a cause for which the network device cannot respond to the RRC connection resume request message.

* * * * *